Inventors:
John S. Prince,
Edward H. Cabaniss,
by Francis K. Doyle
Their Attorney.

Inventors:
John S. Prince,
Edward H. Cabaniss,
by Francis V. Doyle
Their Attorney.

Oct. 29, 1963 E. H. CABANISS ETAL 3,109,090

VARIABLE INCREMENT COMPUTER

Filed April 29, 1959 7 Sheets-Sheet 3

Inventors:
John S. Prince,
Edward H. Cabaniss,
by Francis X. Doyle
Their Attorney.

Inventors:
John S. Prince,
Edward H. Cabaniss,
by Francis V. Doyle
Their Attorney.

VARIABLE INCREMENT COMPUTER

Inventors:
John S. Prince,
Edward H. Cabaniss,
by Francis X. Doyle
Their Attorney.

Inventors:
John S. Prince,
Edward H. Cabaniss,
by Francis X. Doyle
Their Attorney.

Inventors:
John S. Prince,
Edward H. Cabaniss,
by Francis K. Doyle
Their Attorney.

3,109,090

VARIABLE INCREMENT COMPUTER

Edward H. Cabaniss, Schenectady, and John S. Prince, Delmar, N.Y., assignors to General Electric Company, a corporation of New York Filed Apr. 29, 1959, Ser. No. 809,643
21 Claims. (Cl. 235—152)

This invention relates generally to digital computers and more particularly, relates to digital computers of incremental type capable of computing, incrementally, the change in solution since the last previous computation and of performing this computation by operation on incremental changes in the input quantities.

While the computer of the invention is in no sense limited to use in such applications, it offers particular advantages for use in servo systems such as utilized in industrial machinery control, aircraft flight control and armament control systems. In systems of this type, it frequently is desirable to close the servo loop through the computer, i.e., to include the computer within the feedback network of the servo system. When this is done, the operating characteristics of the computer play a very important role in determining the performance capabilities of the overall servo system.

The length of time required for the computer to complete each computation is particularly critical because it determines the response speed of the servo system, and it also directly affects the stability of the system, since excessively long delay between solutions may give rise to oscillation or "hunting" about the control point. Accordingly, if a computer is to operate successfully in applications such as this, it must be capable of very rapid computation.

Few computers of known types afford sufficient rapidity of computation to permit their use in servo systems, particularly not in systems having rapidly changing inputs and requiring relatively high speed of response. While analog computers may afford very rapid operation, they do not provide sufficient accuracy for many applications. Also, excessive complexity of construction and control usually is necessary to obtain the desired versatility of operation, and normally computers of this type include no facilities for data storage.

Digital computers of the well-known general purpose type are capable of any desired accuracy, are versatile in operation and provide data storage, but their operation is relatively slow and they, therefore, cannot accurately follow rapidly changing input quantities. In such computers the time required for each computation is relatively long because the input parameters are reexamined at the start of each major computer cycle, after all calculations on the previously sampled data have been completed. Also, many of the operations of a general purpose machine depend on iterative processes. As a result, the time required to complete a programmed sequence of operations may become quite lengthy, and if the computer is to be inserted into a servo loop the long time delay between solutions may be a cause of instability in the system.

The speed of such machine can be increased somewhat if its internal arithmetic elements are arranged for parallel operation instead of the serial or sequential type as described. However, the increased speed obtained generally would not warrant the required increase in complexity of the equipment.

In general, for applications such as armament control and like servo systems where rapid solution rates are required, the general purpose computer becomes unsuitable. An alternative method of computation must be sought to provide the rapid solution rate necessary for system stability. This weakness of the general purpose computer is to some extent avoided in known incremental computers, which differ from the general purpose computer in that they compute only the change in the solution since the last previous calculation and do not calculate an entire new answer in each cycle of operation. Thus, when compared to the general purpose machine the incremental computer offers a rapid and accurate solution of real time problems with a minimum of equipment.

A computer, mechanized to perform incremental mathematics, does so by the use of increments or changes of the input and output parameters. The computer operates by applying corrections to the input and output data, the values of which have changed between any two sampling times. Previous data and solutions are preserved, and the corrections or increments are applied to these data to compensate for these changes. Therefore, it becomes intuitively obvious that less time and equipment are required merely to apply corrections to the parameters than to operate by eliminating the previous data entirely and computing on new full length data (as is done by the general purpose machine) during each computing cycle. The equipment necessary to mechanize an incremental computer capable of obtaining the high solution rates necessary in a fire control system thus becomes less than that required for a comparable general purpose machine.

In these known incremental computers, however, the increments used normally are limited to two or at most three different values, the increments normally used being +1, 0 and −1. Therefore, during each major cycle of the fixed increment machine, the changes of the input and output parameters are limited in value to ±1. This puts a restriction on the maximum rate of change of the input variables which the computer is capable of following. For instance, for the computer to follow accurately, without error, the computer scale factors would have to be adjusted so that maximum changes in the input and output variables are limited to a change in the least significant digit.

These characteristics of the known incremental computers indicate that such machines are well suited to handling a single problem where all variables are continuous in nature and change rather slowly, and where no step inputs or other abrupt changes are involved. In other applications, however, wherein the input variables change rapidly or abruptly, the operation of these known incremental computers can be made to follow accurately only by use of very complex computer mechanization.

The present invention has as a primary object the provision of digital computers of incremental type not subject to the foregoing and other disadvantages of such prior computers, and combining optimum accuracy and speed of operation.

Another important object of the invention is the provision of an incremental computer utilizing the incremental changes in input quantities for computing incrementally the change in solution since the last previous computation, wherein the increments used are variable and optimized to obtain desired speed of operation.

Still another object of the invention is the provision of incremental computers operating on selected size increments of the input quantities, error quantities and solution, and capable of performing any of many different mathematical computations by proper programming of the computer.

A further object of the invention is the provision of a variable increment computer wherein the increments utilized all are selected from integral powers of the radix in which the computer operates, thus simplifying multiplication and other mathematical operations on and by the incremental quantities.

It is also an object of the invention to provide an incremental computer wherein the increments used are selected from a limited number of integral powers of the radix "two" and which, therefore, do not normally, precisely equal the quantity represented, means being provided in the computer for measuring the error term thus introduced and correcting for it in subsequent operations of the computer.

In carrying out the invention in one form, two or more system variables, constituting the inputs to a computer, are converted to digital form if not already in that form, and are stored in a high-speed memory device for later use in the computer's operation. The present values of the input variables are compared to the initial values or previously updated values, as stored in the memory device, and the incremental changes thus determined. These incremental changes are then "optimized," that is, changed to that integral power of a selected radix (the radix "two" being preferred) which best approximates the incremental change. The "optimum increments" are then stored in a random or rapid access memory device. Arithmetic elements of the computer then calculate the incremental changes in solution which accompany these incremental changes in the input quantities using the optimum increments as necessary, and the incremental change in solution is stored in the computer memory in digital word form. At the same time, the optimum increment which best approximates the computed solution, is determined. Since the increments thus selected are always integral powers of the selected radix, their multiplication by other increments or by digital words of the same radix may be effected simply by delaying such other increments or words in a shift register a variable number of synchronizing pulses corresponding to the power of the increment, thus simplifying multiplication and other computer operations. Any of many different arithmetical operations may be performed by the variable increment computers of the invention, and while all such operations are based on a generally similar algorithm or mode of computation, modification of the algorithm may be necessary in some cases and suitable means may be included in the computer for this purpose.

The invention will be more fully understood and its various objects, features and advantages further appreciated by reference to the appended claims and the following detailed specification when read in conjunction with the accompanying drawings wherein:

FIGURES 1*a* and *b* are graphs showing the comparative action of a variable increment computer and a fixed increment computer in response to a step input;

ARITHMETICAL BASIS OF OPERATION

Figure 1A:
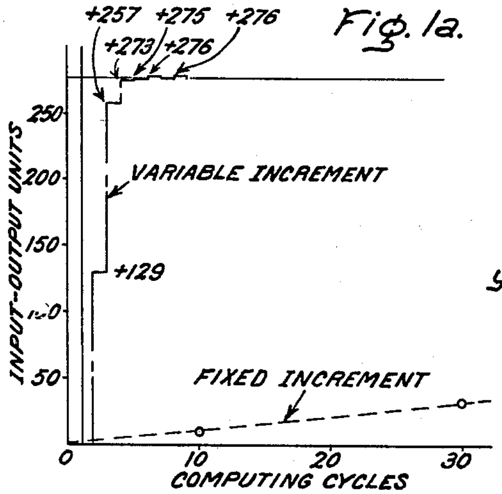

While computers in accordance with the invention are capable of performing many other arithmetical operations such, for example, as integration and the determination of square roots, the following examples covering relatively simple mathematical operations will adequately explain the principles of the incremental mathematics involved. The terms used are defined as follows:

$\Delta$=an increment
$X_i$=latest value of input parameter X (a system variable)
$\Delta X_i$=latest increment of X
$Y_i$=latest value of input parameter Y (a system variable)
$\Delta Y_i$=latest increment of Y
$Z_i$=current computed solution
$\Delta Z_i$=incremental change in solution In the above definitions, the subscript (i) associated with each variable denotes current data. The subscript (i−1) will be used to denote previous data. Thus: ($Z_{i-1}$) signifies the solution computed from the previous data. Therefore:

$$Z_i=Z_{i-1}+\Delta Z_i \quad (1)$$

The sum of X and Y may be expressed as:

$$aX+bY=sZ \quad (2)$$

where $a$, $b$, $s$, are scale factors.

The old sum would be equal to:

$$aX_{i-1}+bY_{i-1}=sZ_{i-1} \quad (3)$$

and the new:

$$aX_i+bY_i=sZ_i \quad (4)$$

Equation 4 may be rewritten as:

$$a(X_{i-1}+\Delta X_i)+b(Y_{i-1}+\Delta Y_i)=s(Z_{i-1}+\Delta Z_i) \quad (5)$$

From Equations 3 and 5 a change in the solution or $s\Delta Z_i$ may be determined:

$$s\Delta Z_i=a\Delta X_i+b\Delta Y_i \quad (6)$$

It is assumed that the previous solution ($sZ_{i-1}$) is stored internally in the computer and can be obtained at any time for future calculations. The new solution then becomes:

$$sZ_i=s(Z_{i-1}+\Delta Z_i) \quad (7)$$

It can be shown that the sequence of operation (or algorithm) by which an addition operation is performed, as shown in Equation 6, is similar to that used for multiplication as well as to those used for other operations. All these sequences or algorithms can be obtained from one general algorithm. Accordingly, several different operations can be performed by one mechanization.

Subtraction is essentially the same as the addition operation with one exception. To subtract, the sign of the scale factor ($b$) is changed. However, as in the conventional general purpose computer, the method of complements is employed to perform the operation as an addition.

$$s\Delta Z_i = a\Delta X_i + (-b\Delta Y_i) \quad (8)$$

The operation of incremental multiplication can be demonstrated in the following manner. To obtain the product of X and Y:

$$X_iY_i = (Y_{i-1}+\Delta Y_i)(X_{i-1}+\Delta X_i) = s(Z_{i-1}+\Delta Z_i) \quad (9)$$

expanding and writing:

$$Y_{i-1}X_{i-1}+\Delta X_iY_{i-1}+X_{i-1}\Delta Y_i + \Delta X_i\Delta Y_i = sZ_{i-1}+s\Delta Z_i \quad (10)$$

From a previous solution the computer had obtained the product:

$$sZ_{i-1} = (X_{i-1})(Y_{i-1}) \quad (11)$$

The value for $(X_{i-1})(Y_{i-1})$ is eliminated from Equation 10, since it appears on both sides of the expression. Equation 10 then reduces to:

$$\Delta X_iY_{i-1}+X_{i-1}\Delta Y_i+\Delta X_i\Delta Y_i = s\Delta Z_i \quad (12)$$

By making a substitution the second order term $(\Delta X_i\Delta Y_i)$ can be eliminated. By definition:

$$X_{i-1} = X_i - \Delta X_i \quad (13)$$

By substituting this value for $(X_{i-1})$ in Equation 12:

$$\Delta X_iY_{i-1}+(X_i-\Delta X_i)\Delta Y_i+\Delta X_i\Delta Y_i = s\Delta Z_i \quad (14)$$

Equation 14 then simply reduces to the following form:

$$\Delta X_iY_{i-1}+X_i\Delta Y_i = s\Delta Z_i \quad (15)$$

Equation 15 states that to obtain the change in the solution $(\Delta Z_i)$, the new value of $X(X_i)$ is multiplied by the change in $Y(\Delta Y_i)$ and added to the old value of $Y(Y_{i-1})$, which in turn has been multiplied by the change in $X(\Delta X_i)$. It will be noted that the form of Equation 15 is comparable to that of Equation 6 used for addition. The only difference is that the constants "*a*" and "*b*" are substituted for the variable $Y_{i-1}$ and $X_i$. By proper gating within the computer, it is possible to substitute either the constants or the variables into the sequence of operation expressed by the Equation 6 or 15. Thus the computer uses the same sequence or algorithm for various operations, such as addition, subtraction and multiplication.

To perform a division operation, some modification of the algorithm is required. The operation cannot be performed by the above algorithm in the conventional manner. The algorithm is slightly modified and special mechanization provided to perform this "indirect" type of operation. Consider the division of X by Y.

$$sZ = \frac{X}{Y} \quad (16)$$

As before, the old solution can be represented by:

$$\frac{X_{i-1}}{Y_{i-1}} = sZ_{i-1} \quad (17)$$

And the new quotient can be written as:

$$\frac{X_{i-1}+\Delta X_i}{Y_{i-1}+\Delta Y_i} = sZ_{i-1}+s\Delta Z_i \quad (18)$$

The new change in solution is $s\Delta Z_i$ and solving for $s\Delta Z_i$:

$$s\Delta Z_i = \frac{X_{i-1}+\Delta X_i}{Y_{i-1}+\Delta Y_i} - \frac{sZ_{i-1}(Y_{i-1}+\Delta Y_i)}{Y_{i-1}+\Delta Y_i} \quad (19)$$

Substituting the values for $sZ_{i-1}$ from Equation 17 into Equation 19:

$$s\Delta Z_i = \frac{\Delta X_i - sZ_{i-1}\Delta Y_i}{Y_i} \quad (20)$$

From the four operations described, it is now possible to write a general sequence of operations or arithmetical algorithm which can be modified by internal computer controls to perform any of the above. To keep the development general, the expressions will be written in terms of the new variables, T, W, U and V. Therefore, the general algorithm will be written as:

$$U_i\Delta T_i + V_{i-1}\Delta W_i = s\Delta Z_i \quad (21)$$

The various algorithms for the four mathematical operations can be written:

Addition—
Let $$U_i = a$$
$$V_{i-1} = b$$
$$\Delta T_i = \Delta X_i$$
$$\Delta W_i = \Delta Y_i$$

Then from (21), the addition algorithm of Equation 6 is:

$$a\Delta X_i + b\Delta Y_i = s\Delta Z_i \quad (6)$$

Similarly, by substitutions into the remainder of the arithmetic operations:

Subtraction—
Let $$U_i = a$$
$$V_{i-1} = -b$$
$$\Delta T_i = \Delta X_i$$
$$\Delta W_i = \Delta Y_i$$
$$a\Delta X_i + (-b\Delta Y_i) = s\Delta Z_i \quad (8)$$

Multiplication—
Let $$U_i = X_i$$
$$V_{i-1} = Y_{i-1}$$
$$\Delta T_i = \Delta Y_i$$
$$\Delta W_i = \Delta X_i$$
$$\Delta X_iY_{i-1} + X_i\Delta Y_i = s\Delta Z_i \quad (15)$$

Division—
Let $$U_i = Y_i$$
$$V_{i-1} = Z_{i-1}$$
$$\Delta T_i = \Delta Z_i$$
$$\Delta W_i = \Delta Y_i$$
$$\Delta Z_i = \Delta X_i$$
$$Y_i\Delta Z_i + Z_{i-1}\Delta Y_i = s\Delta X_i$$

or $$\Delta Z_i = \frac{s\Delta X_i - Z_{i-1}\Delta Y_i}{Y_i} \quad (20a)$$

Before continuing with the extension of the algorithm to more advanced calculations, the mechanization of the simple algorithm illustrated in the previous paragraphs will be discussed.

INCREMENTAL COMPUTER TECHNIQUES

As noted above, computers in accordance with this invention differ from conventional incremental computers in that the increment size to be inserted into each computation is variable. Theoretically, if an infinite choice of increment sizes were made available, the computer would be capable of following changing inputs with a minimum of error. To include an infinite choice of increments in the computer's mechanization would make the machine overly complex for most applications. Therefore, it is desirable to limit the choice and size of increments to definite values. Even with limited choice of increment sizes, it is entirely possible to construct computers capable of following rapidly changing inputs with only small error.

In common with most computers, multiplication in incremental type machines is a relatively difficult operation to perform. In the foregoing examples, it can be noted that multiplication by increments is used repeatedly. In accordance with the invention, performance of these multiplication operations is greatly facilitated by limiting the choice of the increments to integral powers of the radix two (i.e. $\pm 2^0 = 1$; $\pm 2^1 = \pm 2$; $\pm 2^2 = \pm 4$; $\pm 2^3 = \pm 8$, etc.).

It will be obvious that integral powers of another radix could be used, if desired. These increments are termed "optimum increments." To multiply by an optimum increment, it is only necessary to delay the multiplicand by a number of digit or bit positions equal to the power of the increment. The following is an example:

Multiplication of $6\times4=24$

The binary equivalents of the above numbers are written as:

$$(6)=110;\ (4)=100=2^2$$
$$(110)(100)=11000=24$$

From the foregoing example it will be noted that the multiplicand (110) is merely shifted over two binary positions in multiplication. Thus, multiplication by an optimum increment simply becomes a delaying process, with the multiplicand being delayed by a number of digit positions equal to the power of the increment.

Another important advantage in limiting the choice of increments to integral powers of the radix two, or to integral powers of another radix if preferred, is that substantial simplification of the high speed or random access memory is obtained. The size and the complexity of the memory is reduced, since it is required only to store the power and and sign of the increment. The power and sign together fully identify the particular increment involved, the radix or base being known. The remainder of this specification will be written in terms of binary numbers, that is, the radix two, it being understood that any other radix could be used, if desired.

The power of the maximum size increment used in a particular computer depends on the application to which the computer is to be put, and more specifically on the expected rates of change of the input variables to the computer and its required speed of computation. If the computer must accurately follow rapidly changing input variables, then the maximum size increment should be made relatively large, whereas if relatively slower computer operation is permissible in the application, then the maximum size increment may be made relatively small with resultant simplification in mechanization of the computer. In each case the most desirable compromise is made between computer complexity, on the one hand, and rapidity of computer operation on the other.

For example, in a computer designed for a particular armament control application, it was found that the optimum size for the largest increment was $2^7=128$. By limiting the maximum increment to this value, simplification of many of the computer sections is obtained. This is especially true in the case of any high speed auxiliary memory that the computer may require. (The need of an auxiliary high speed intermediate storage medium becomes obvious, when it is recalled that in performing the programmed sequence of operations, a certain increment may be used many times in the sequence.) Since only integral powers of 2 are employed in the increments used in the computer calculations, only the power and sign of the increment need to be stored in the memory.

Conveniently, the highest order digit of the stored number may be used to designate the sign of the increment, with a "zero" representing a positive sign and a "one" representing a negative sign. The remaining digits of the stored number then are available to designate the power of the increment. For example:

| | Sign | Magnitude |
|---|---|---|
| Largest positive increment= | 0 | $111=+2^7=128$ |
| Smallest increment= | 0 | $000=2^0=1$ |
| Largest negative increment= | 1 | $111=-2^7=-128$ |

To better understand the use of increments, the computer's reaction to a step input may be examined. In essence, the computer will try to duplicate this input by selecting and accumulating optimum increments. The total accumulation is then compared to the input and the remainder (or residue) is then used to select the next optimum increment value.

In the following tabulation are shown the values of the input X in slewing to a step function input ($\overline{X}$).

| Computer Cycle | Input ($\overline{X}$) | $X_i$ | $X'$ | R |
|---|---|---|---|---|
| 0 | 0 | 0 | $2^0$ | 0 |
| 1 | 275 | 1 | $+2^7$ | 274 |
| 2 | 275 | 129 | $+2^7$ | 146 |
| 3 | 275 | 257 | $+2^4$ | 18 |
| 4 | 275 | 273 | $+2^1$ | 2 |
| 5 | 275 | 275 | $+2^0$ | 0 |
| 6 | 275 | 276 | $-2^0$ | $-1$ |
| 7 | 275 | 275 | $+2^0$ | 0 |

where:

$\overline{X}$=step input $X_i$=present accumulated computer value of $$X=(X_{i-1}+\Delta X)$$

$X'$=integral power of radix 2 increment which most nearly approximates the difference between the step input and the accumulated computer value.

$$(\overline{X}-X_i)=R=\text{remainder}$$

In this example the maximum increment value is limited to $2^7$ or 128. Using increments between $2^0$ and $2^7$, the computer rapidly slews to the input value and follows it. Better agreement between the computer value and input value may be obtained by adjusting the scale factor and making the least significant digit something less than one (say, ½ or ¼).

FIGURE 1*a* provides a graphic example of the rapid slewing capability of the variable increment computer of this invention compared to the slewing capability of a fixed increment computer, in responding to a step input. Considering a step input of 275 units, as in the above tabulation, the variable increment computer of this invention reaches the desired value in 5 computer cycles. A fixed increment computer, limited to an increment value of 1 would require 275 computer cycles before it would provide the desired computer response to the step input.

Figure 1B:
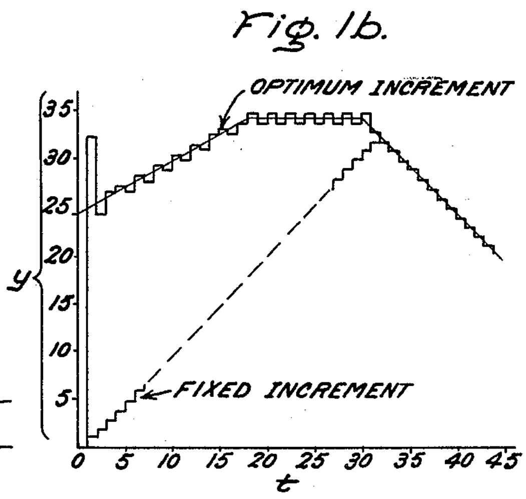

FIGURE 1*b* shows another example of the capability of the variable increment computer of this invention compared to a fixed increment computer. In FIGURE 1*b* an arbitrary, varyng step input is introduced to the computer. It will be noted that the variable increment computer rapidly slews to the input in three cycles and then closely follows the variations of the input. The fixed increment computer does not begin to follow until the thirtieth cycle. The area between the curve indicating the input and the curve indicating the fixed increment computer is a graphic representation of the error in the fixed increment computer due to rate limiting, that is, the limiting rate the computer is able to follow changing inputs.

In examining the table showing the example of computer operation, it is evident that the increment (represented by some power of 2) cannot represent the answer exactly. Therefore, a remainder exists (R) which must be preserved if high accuracy is to be achieved. These remainders must be stored in the computer and re-introduced into the computer operations every computer cycle. This remainder is used to select the increment value to be used in the succeeding cycle.

The arithmetical algorithms which have been previously developed must now be modified to include the remainder or residue terms introduced by the use of integral power of 2 increments. To see how the general algorithm must be modified, the modification of the multiplication algorithm will be first considered. This will serve as an example since the others are modified in a similar manner.

Multiplication—

From Equation 15:

$$\Delta X_i Y_{i-1} + X_i \Delta Y_i = s\Delta Z_i \quad (15)$$

Rewriting the above in terms of powers of 2 (optimum increments) and including the remainder term (R), Equation 15 becomes:

$$X_i' Y_{i-1} + X_i Y_i' + R_{i-1} = SZ_i' + R_i \quad (22)$$

where $R_{i-1}$=old remainder term $R_i$=new remainder term $X_i'$=increment of variable X optimized to the nearest power of radix 2

$Y_i'$=increment of variable Y optimized to the nearest power of radix 2

$Z_i'$=increment of solution Z as optimized to the nearest power of radix 2

Addition—

$$aX_i' + bY_i' + R_{i-1} = sZ_i' + R_i \quad (23)$$

Subtraction—

$$aX_i' + (-bY_i') + R_{i-1} = sZ_i' + R_i \quad (24)$$

Division—

This operation has to receive special treatment. Equation 20 can be rewritten as follows:

$$Y_i s\Delta Z_i = \Delta X_i - sZ_{i-1}\Delta Y_i \quad (20)$$

Including the error term and adjusting for optimum increments, the expression becomes:

$$Y_i sZ_i' + R_i = X_i' - sZ_{i-1} Y_i' + R_{i-1} \quad (25)$$

The algorithm for the foregoing computations can be generalized to the following expression:

$$U_i T_i' + V_{i-1} W_i' + X_i' + R_{i-1} = sZ_i' + R_i \quad (26)$$

where:

$U_i$=latest value of variable U $T_i'$=optimum increment of variable V $V_{i-1}$=previous value of variable V $W_i'$=optimum increment of variable U $X_i'$=optimum increment of variable X Obviously the above variables will be those system parameters on which the computer operates.

Figure 2:
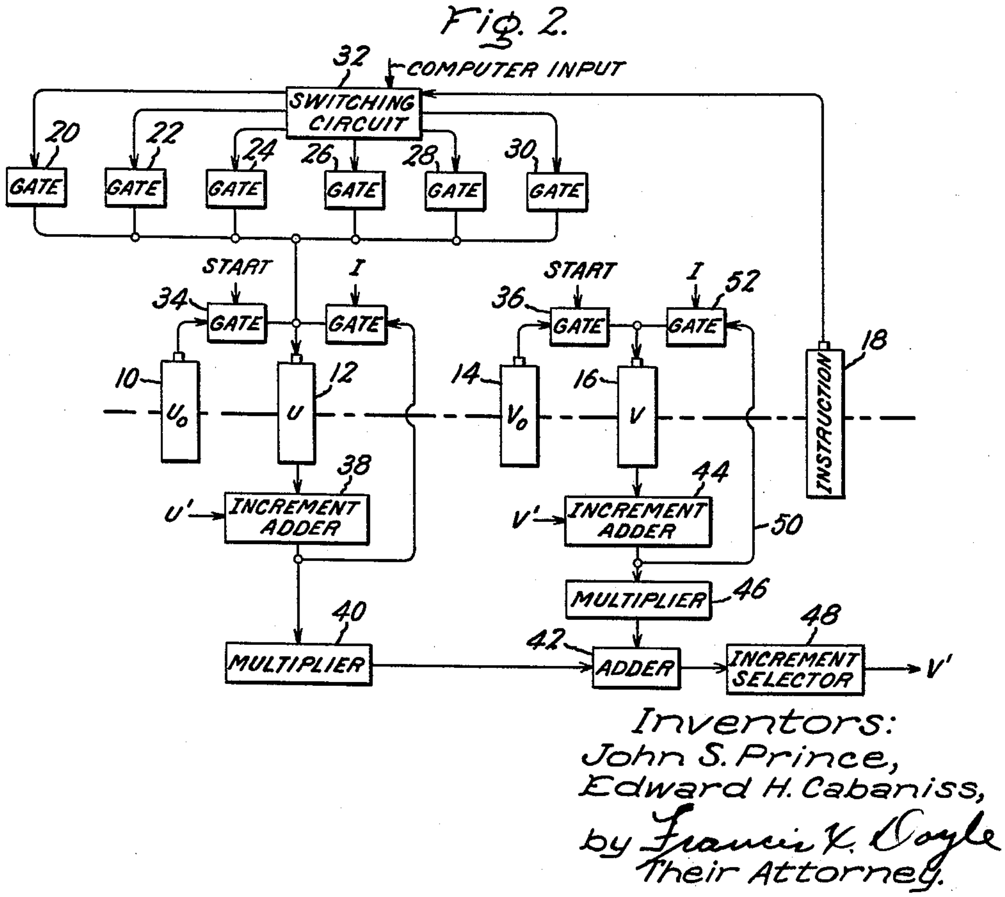
FIGURE 2 is a block diagram, in one form, of a portion of a variable increment computer showing a preferred manner of selecting optimum increments corresponding to changes in system variables.

Referring now to the remainder of the drawings in which like numerals are used to indicate like parts throughout, the present invention in one form of mechanization will be described. As will be well understood by those skilled in the art, a number of input variables may be provided to the computer, the computer being programmed to provide the desired operation upon such variables and perform the necessary calculations to provide the system, to which it is connected, with the desired computer output required for the operation of the system. FIGURE 2 is a block diagram showing one form in which various system variables may be provided as inputs into the computer of this invention, and a preferred method of obtaining optimum increments, corresponding to changes in such system variables. In many instances in which a computer is to be utilized in a system, to perform a desired function within the system, the computer is provided with initial conditions, such conditions usually being included within the computer itself and being provided to the various sections of the computer upon starting of the operation. These initial conditions are generally preset into the computer, depending upon the desired use of the computer and are considered as average conditions at which the computer may be started to operate within the system. For example, in a fire control system, the range at which a target may generally be picked up by the system would be provided as an initial condition to the computer to be utilized in such system. By means of the initial condition, which is preset into the computer, the computer is enabled to start a problem or a function at a point close to the actual conditions of the system at the time the computer is started, rather than starting from zero and having to perform a number of calculations in order to arrive at the particular conditions of the system.

With this in mind, and referring now to FIGURE 2, a portion of the variable increment computer of this invention is shown, including one form of a preferred method of providing the system variables as inputs to the computer. As shown in FIGURE 2, the computer is provided with a number of storage devices, which may be, for example, storage tracks on a magnetic memory drum, such as is shown in Patent No. 2,614,169 to A. A. Cohen et al., issued October 14, 1952. The storage devices or tracks are labeled $U_0$, U, $V_0$, V, and instruction, and are designated by the numbers 10, 12, 14, 16 and 18 respectively. The $U_0$ and the $V_0$ track, or storage devices 10 and 14, are the initial condition tracks, while the tracks 12 and 16, the U and V tracks, are the tracks utilized to change the variables or system parameters to the desired optimum increments according to changes in the sytem parameters. Also shown in FIGURE 2 are a number of gates 20, 22, 24, 26, 28 and 30 which are connected to a switching circuit 32. The various parameters or system variables are provided from the system to the switching circuit 32 and are switched to the various gates 20—30 as indicated by the lines of the drawing. The instruction track 18 provides the desired instructions to the switching circuit, according to the programming of the computer, to switch the circuit 32 to provide the input to the computer according to the desired system variable or parameter. When the computer is first inserted into the system, the initial conditions which are on the $U_0$ and the $V_0$ tracks 10 and 14, will be inserted into the U and V tracks 12 and 16, by means of the gates 34 and 36 respectively, which are electronically controlled on starting the computer to allow the values of the initial conditions to be written upon the U and V tracks. Of course, it will be understood that the U and V initial conditions are different system parameters, and the average or general value of these parameters is inserted onto the correct track at the beginning of the operation of the computer.

Considering, for example, the use of the computer of this invention in a fire control system, some of the input variables would be azimuth, elevation, and range. These values may be provided to the computer by means of gates 20, 22 and 24. Other system variables would be provided by means of gates 26, 28 and 30, these values being switched from the switching circuit 32 to the various gates. Considering, for example, range, at the start of the computer the average range at which the target would be sighted would be placed on the V track, 16, from the initial condition track $V_0$, 14, through the gate 36. By means of the instruction track 18 the switching circuit 32 would be controlled to provide to the gate 20, the actual range that the target is found by the radar of the fire control system. This value is passed from the gate 20 and written on the U track 12. At a later point in the revolution of the drum, upon which the U and V tracks are mounted, the sampled value of range would be fed from the U track 12 through an increment adder 38 and a multiplier 40 to the word adder 42. Since, in this operation, there is no increment to be added to the sampled value U, the value U passes through the increment adder 38 without change. Also, there is no multiplication to be performed on the U value, so it passes through the multiplier 40 without change, effectively being multiplied by $2^0$ or "one". At the same time the initial condition of range would be taken from the V track 16 through the increment adder 44, the multiplier 46 to the word adder 42. Since this is the initial condition of the range, there would be no increment added in the increment adder 44. The sampled range is to be compared with the initial condition range;

therefore, the initial condition range from the V track would be multiplied in the multiplier 46 by minus 1. Multiplying by minus 1 would give a minus V value, which, when added to the sampled U value, would provide a difference between the sampled range and the initial range placed on the drum track V. The difference between the sampled value and the initial condition of range would then be fed to the increment selector 48 and the difference would be changed to an optimum increment, that is, the closest value of the radix two which would approximate the difference between the sampled and the initial value of range as written on the U and V tracks. This optimum increment, noted as V′, is then sent to the random access memory (FIGURE 3) for use in various calculations within the computer. During the next computer cycle, the sampled value of range will again be switched through the switching circuit 32, the gate 20, and written on the U track 12. Then, as the drum rotates, this sampled value of range is again fed through the increment adder 38, the multiplier 40 and into the word adder 42, again without change. At the same time the initial condition value is read from the V track 16 and into the increment adder 44. This time, however, the optimum increment, which was selected in the last operation, is now added to the range value as read from the V track and this new value of range is fed to the multiplier 46. At the same time, the new value of range is taken over the line 50 through the gate 52 and written on the V track 16. In the multiplier 46 the updated range value is again multiplied by minus 1, so that it may be added to the sampled value of range in the adder 42 to provide a difference, and is then fed to the adder 42. The sampled value of range and the latest updated value of range are again compared in the adder 42 and their difference is fed to the increment selector 48 where a new optimum increment is selected and again sent to the random access memory. In this manner, it will be understood, that the range value as written on the V track 16 is rapidly updated to the sampled range which is the actual range at which the system is to operate. The rapidity with which this is possible, and the manner in which the range will then follow, is shown more particularly in FIGURES 1*a* and 1*b*. Of course, it will be understood that all of the various systems variables or parameters may be handled in a similar fashion by use of the switching circuit 32 and the various gates 20, 22, 24, 26, 28 and 30. Obviously, the optimum increments which are obtained by means of the increment selector 48, and which are then stored in the random access memory, are available throughout the computer, as required, for all calculations which are to be performed by the computer.

Figure 3:
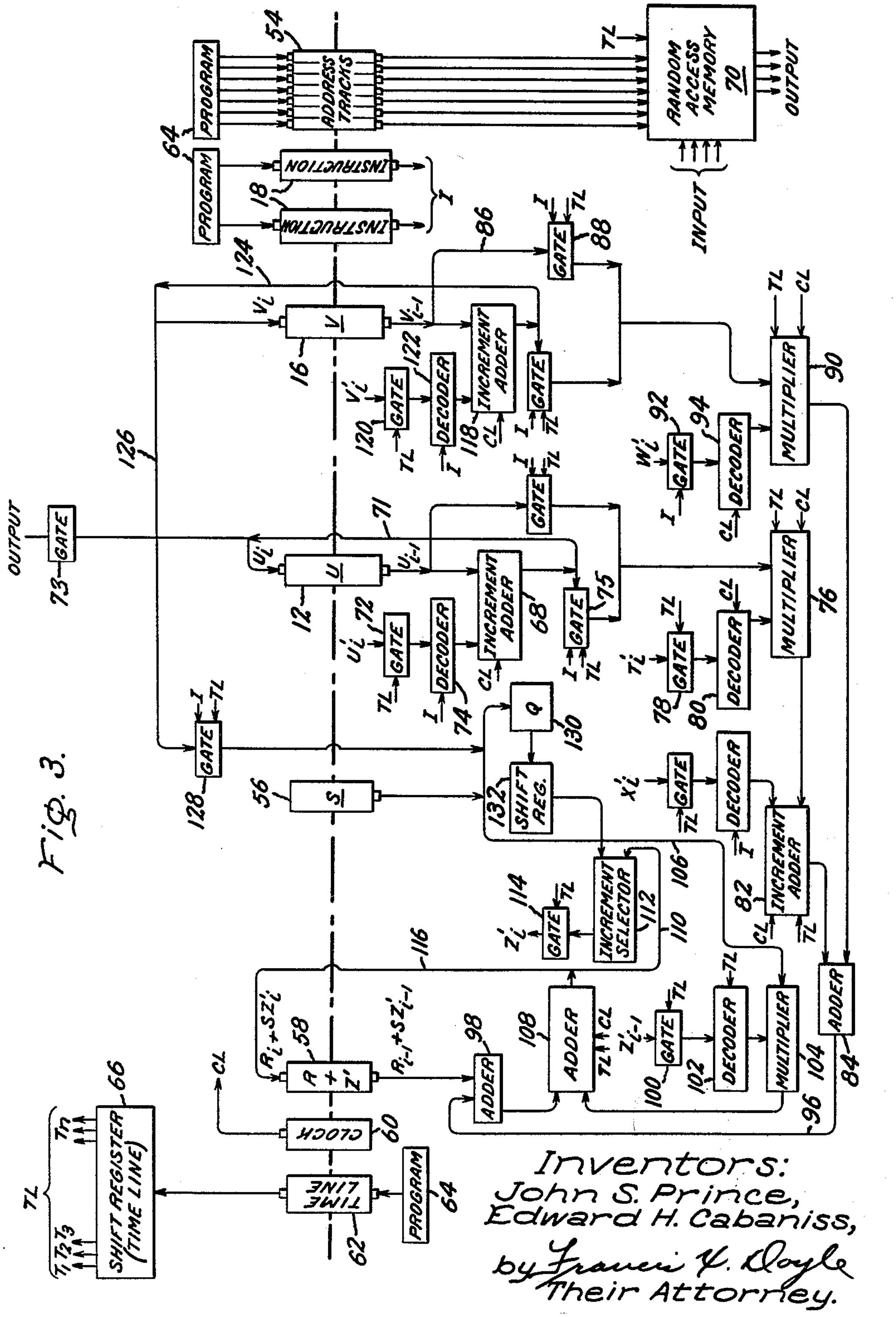
FIGURE 3 is a block diagram of one form of a variable increment computer, operating in accordance with the principles of the invention.

Referring now to FIGURE 3, there is shown a block diagram, in one form, of a variable increment computer operating in accordance with the principles of this invention. FIGURE 3 shows in more complete detail the various components which are utilized in the computer of this invention, many of the components being readily understood by those skilled in the art as being utilized in other types of computers. As shown in FIGURE 3, a magnetic drum is utilized, including the U track 12 and the V track 16, a pair of instruction tracks 18, a number of address tracks 54, a scale track 56, a remainder or solution track 58, as well as a clock track 60, and a time line track 62. The instruction tracks 18, the address tracks 54 and the time line track 62 are shown as being fed by means of a program block, generally labeled 64, and it will be understood by those skilled in the art that the program, which the computer is to be utilized to perform, is fed into the instruction tracks 18, the address track 54, and the time line track 62, to provide the necessary coordination and the desired operation of the various components of the computer. The clock track 60 is utilized, as will be understood, to provide the clock pulse for the over-all use of the computer. In general, it provides a clock pulse for each digit of the words utilized within the computer. The time line track 62 feeds a shift register 66 which provides the various time line pulses to the different components of the computer. It will be understood by those skilled in the art that these time line pulses are timed variously with the different words on which the computer operates so as to provide the desired time line pulse at the beginning or end of a word, enabling the desired operation of the particular component. Throughout the block diagram of FIGURE 3 the various component blocks are labeled as being fed with a time line, or a clock pulse, or instruction pulse, as is necessary, to perform the desired operation. It is believed well known to those skilled in the art, the manner in which the various instructions and time line and clock pulses are utilized in a computer, so as not to require a detailed description thereof, in the specification of this invention.

The diagram of FIGURE 3 will be described in conjunction with the symbols set forth in Equation 26 and will be generally described in the manner of a multiplication problem as in Equation 22. Considering first the U track 12, the value of $U_{i-1}$ which, as hereinbefore noted, indicates the previous value of the variable U, is fed from the track 12 into an increment adder 68. At the same time, the optimum increment $U_i'$ is brought from the random access memory 70 to the gate 72 and then through the increment decoder 74 and into the increment added 68. The increment adder adds the increment $U_i'$ to the previous value $U_{i-1}$, thereby updating the value of U to the present calculated value $U_i$. The output $U_i$, of the increment adder 68, is then fed over a line 71 to the U track 12, to there place on the track the new value of U. As indicated in the diagram, the output $U_i$, which is the latest calculated value U, may be taken out from the gate 73 and utilized wherever desired in the system of which this incremental computer may be a part.

Depending upon the particular type of calculation which is to be performed on the variable quantity U the latest computed value of U may be fed through the gate 75 to the multiplier 76. Should a multiplication of the quantities U and V be desired (Equation 26), then the latest increment of the value V, indicated as $T_i'$, will be brought from the random access memory 70 to the gate 78, thence through the decoder 80 to the multiplier 76. And the new value of U will be delayed in the multiplier 76 according to the power of two of the increment V ($T_i'$) which is fed into the multiplier 76. Thus, as previously set out, the new value of U is multiplied by the optimum increment representing the change in V. This multiplication is then fed to the increment adder 82 and, assuming no addition in the increment adder, is fed onto word adder 84, without change.

While the value U is being updated and then multiplied by the incremental change in the variable V, the V track 16 is also operating to perform the desired multiplication. In this instance the old value of V($V_{i-1}$) will be fed over the line 86 to the gate 88. From gate 88 the old value of V is fed to the multiplier device 90. At the same time that the old value of V is fed to the multiplier 90, the optimum increment of the change in the value U, indicated as $W_i'$, is fed from the random access memory 70, through the gate 92 and the decoder 94, to the multiplier 90. As hereinbefore pointed out, the old value of V is multiplied by the optimum increment of U merely by being delayed in the multiplier device 90, a sufficient number of clock pulses according to the power of the increment of U. The old value of V as multiplied by the optimum increment U is then fed to adder 84, arriving at the adder at the exact time that the multiplication of the new value of U by the optimum increment V is being fed from the multiplier device 76 to the adder 84. The multiplied values are then added in the adder 84 and fed over the line 96 to adder 98.

At adder 98 the old remainder $R_{i-1}$ is added to the multiplication, from the remainder or solution track 58, in the manner set forth in Equation 22. However, it will be noted that in adder 98, the previous remainder $R_{i-1}$ is not alone added to the multiplication. The previous incremental solution $SZ_{i-1}'$, which was part of the last operation is also included. In order to eliminate this incremental solution, which is not desired, the previous incremental solution, selected by the increment selector, is brought from the random access memory 70 to the gate 100 and thence into the decoder 102. The decoder increment $Z_{i-1}'$ is then fed to the multiplier 104. In the multiplier 104 the decoder increment $Z_{i-1}'$ is multiplied by the negative of the scale factor, which is carried to the multiplier 104 over the line 106. This negative word is then brought to the adder 108 along with the total from the adder 98. Within the adder 108 the old value $SZ_{i-1}'$ is cancelled out by virtue of the negative $SZ_{i-1}'$ from the multiplier 104. Therefore, the output of the adder 108 is the multiplication of U and V plus the old remainder $R_{i-1}$ which, as noted in Equation 22, is equal to $SZ_i'+R_i$. This value $SZ_i'+R_i$ is fed from the adder 108 over the line 110 to the increment selector 112.

The increment selector 112 then selects the closest value of the increment to the given radix and feeds it through the gate 114 to the random access memory 70 as the latest incremental solution to that part of the problem. At the same time that this value is being fed to the increment selector 112, it is also fed over the line 116 and is written on the remainder track 58 as the quantity $SZ_i'+R_i$. Of course, it will be understood that at the next revolution of the remainder track 58 the value will then be presented as $R_{i-1}+SZ_{i-1}'$, since it will be the previous solution, because later in time when used.

It should be understood that when the value $V_{i-1}$ is fed over the line 86 to the gate 88 for purposes of the multiplication problem, it is also fed to the increment adder 118 where the latest V increment ($V_i'$) from the random access memory 70, which is fed through gate 120 and decoder 122, is also present. This latest increment of $V(V_i')$ is added to the old V quantity ($V_{i-1}$) in the increment adder 118, and is then fed over the line 124 to the top of the V track 16 where it is written as $V_i$, the present computed value of the variable V.

Where the problem involved is one of dividing the quantity U by the quantity V, of course, a different path will be taken by the quantities U and V, see Equations 20, 25. Therefore, in performing division, the divisor is placed on the V track and is sent through the increment adder 118, where it is updated by the addition of the optimum increment $V_i'$. This updated value $V_i$ is then fed over lines 124 and 126 to the gate 128 and then to the quotient or "Q" logic circuit 130. In the "Q" logic circuit 130, the optimum increment of the word $V_i$ is effectively selected and this integral power of two is used in the increment selector 112 to perform the desired division, as will be explained in the detailed consideration of the circuits. As shown, the optimum increment is fed from the "Q" logic circuit 130, through the shift register 132 to the increment selector 112. It will be understood that the quotient pulse is delayed in the shift register until the remainder of the operation is completed. Of course, the dividend is obtained from the U track and the various necessary increments which have been stored in the random access memory.

It will be noted that the scale factor S is taken from the scale track 56 to the "Q" logic circuit 130. This is necessary since in direct mathematical operations, where the scale factor S is other than "one," the word entering the increment selector 112 should be divided by the value of S before the actual selection of increments. Normally S will not be an integral power of two but rather a full length word. Since it is not economically feasible to divide by a full length word, the closest integral power of two is selected in the "Q" logic circuit 130, since it is fairly easy to divide by an integral power of two.

The program 64 which is indicated for the instruction tracks 18 and the address track 54, will of course, be the desired program which is set into the incremental computer to perform the desired function. It is not believed necessary or desirable to describe the operation of these in any detail since their function is well known in the art. The instruction tracks 18 provide the necessary instructions to the various portions of the increment computer to obtain the desired functions, such as for example, multiplication, square root, or integration, as is desired in the program. The address tracks 54 provide the desired addresses to the random access memory for obtaining the various increments stored therein and applying them to the desired portion of the incremental computer, as necessary. The function of the time line track 62 and the clock track 60 are believed equally well known to those skilled in the art so as not to require any extended discussion thereof.

Figure 4:
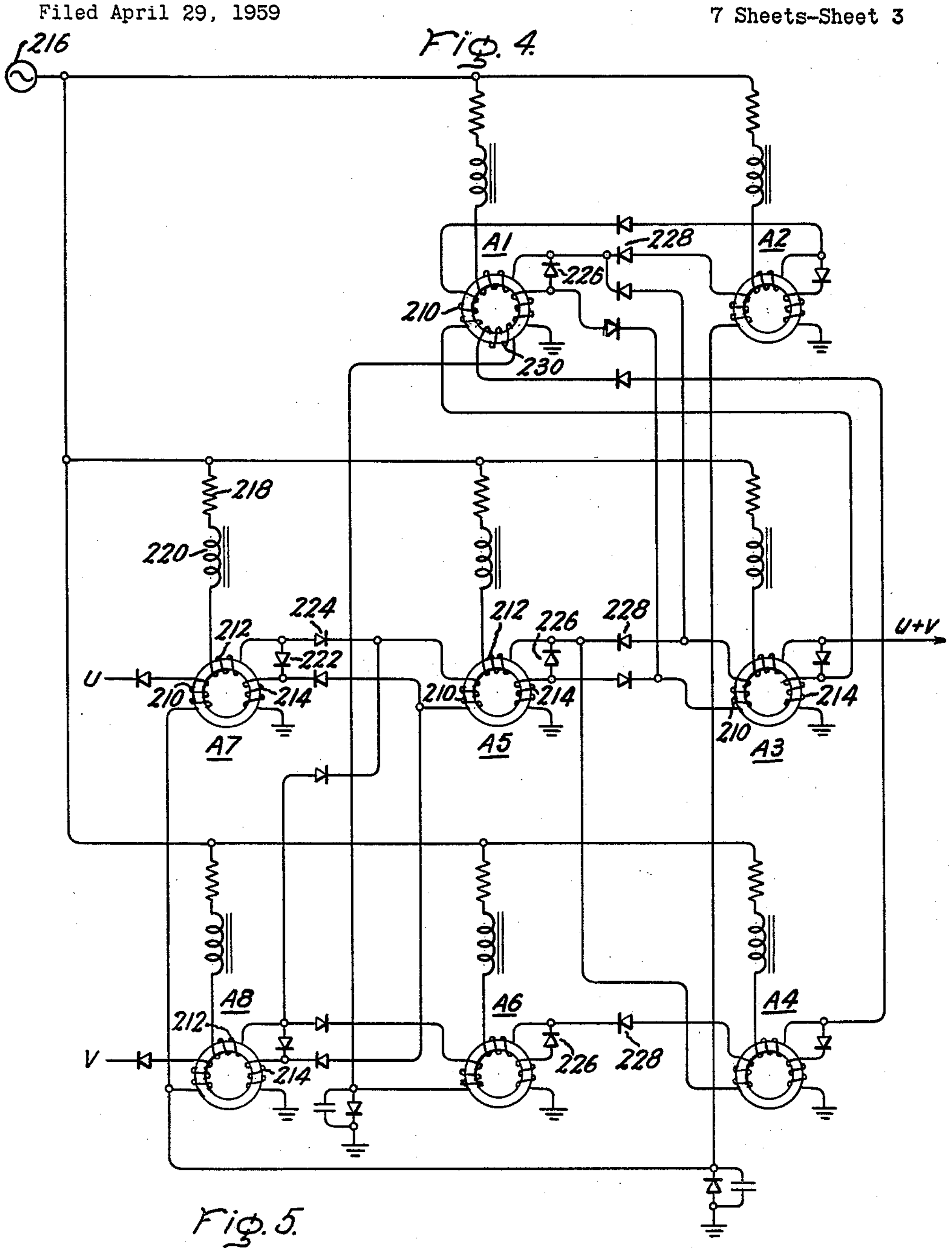
FIGURE 4 is a schematic diagram of a word adder, in one form, constituting one element of the computer of FIGURES 2 and 3.

Having described in some detail the incremental computer as disclosed in the block diagrams of FIGURES 2 and 3, there will now be described the various sub-systems set forth in these blocks which are shown in the other drawings relating to this invention. Referring now to FIGURE 4 there is shown a schematic diagram of a full word adder. While the schematic of FIGURE 4 is shown as utilizing magnetic core logic circuits, and the remainder of the drawings are shown in symbolic notation for core-logic circuits, it will be understood that these are for purposes of description only. Other types of circuits may be used if desired, for example, magnetic films or other well known electronic computer circuits. An excellent discussion of various computer components and circuits, which may be used in conjunction with this invention is found in the book "Digital Computer Components and Circuits," by R. K. Richards (D. Van Nostrand Company, Inc., 1957).

As shown in FIGURE 4, there are eight cores provided, labeled A1, A2, A3, A4, A5, A6, A7 and A8. The words to be added in the adder of FIGURE 4 are indicated as U and V, and enter into the cores A7 and A8 simultaneously, as full length serial words. The operation of the various core logic circuits shown in FIGURE 4 is fully explained in the co-pending patent application of Clarence P. Christensen and Edward H. Cabaniss, Serial No. 660,003, filed June 17, 1957, entitled Magnetic Core Logic Circuits, now Patent No. 2,838,693, and assigned to the same assignee as this invention. As is more fully explained in the aforementioned copending patent application, the magnetic core logic circuit comprises a plurality of magnetic core elements, eight being shown for the full word adder of FIGURE 4, each including a saturable core of toroidal configuration. These cores may comprise ceramic bobbins having one or more layers of magnetic tape wrapped about them, or if preferred, each core may consist of a single solid piece of magnetic material of toroidal or other suitable configuration. In all cases, however, the core material and configuration preferably are such as to provide generally rectangular hysteresis characteristics, so that the cores possess two possible states of magnetic saturation and may be flipped from one state to the other by a magnetomotive force generated by current flow through one of the core windings.

For convenience, one possible state of magnetic saturation of each core may be arbitrarily specified as its "one" state, and the other its "zero" state. As will be apparent to those skilled in the art, the change in magnetic flux in the core which accompanies a change from the "one" to the "zero" state, or vice versa, gives rise to induced voltages in the core windings of magnitudes determined by the number of turns of the windings and the rate of change of core flux.

Each core, with the exception of A1, is shown in FIGURE 4 as having three windings. Considering core A7, these windings are an input winding 210, an advance winding 212 and an output winding 214. The advance windings 212 of all cores are connected to a common alternating voltage power supply 216, the voltage output of which may be of either square wave or sine wave form, the latter being preferred by reason of the greater simplicity and substantially lower cost of sine wave generators and amplifiers. The output frequency of this power supply 216 determines the rate at which the circuit operates (the computer digit rate or the clock rate), and therefore, is preferably made as high as possible, consistent with satisfactory performance. A power supply frequency of the order of 150 kilocycles has been found suitable for most applications and provides relatively high operating speed.

As shown, an impedance element comprising a resistor 218 and inductor 220, the latter being of ferrite core or other suitable type, is interposed in the connection between each of the core advance windings 212 and the power supply 216, for purposes of stabilizing current flow to the core windings and preventing any voltages induced in the windings with change of core state from reflecting back to the power supply.

The advance winding 212 of core A7 is connected to the output winding 214 of that core through unidirectional current flow means 222, and is connected through a second unidirectional current flow means 224 to the input winding 210 of the core A5. Similarly, the advance winding 212 of core A5 is connected through unidirectional current flow means 226 and 228 to the core A5 output winding 214 and to the core A3 input winding 210 respectively. These unidirectional current flow means may be of any suitable conventional type but preferably are semiconductor diodes utilizing either germanium or silicon as the semiconductive material.

In operation, with the diodes connected with polarities as shown in FIGURE 4, during the positive half cycle of the power supply voltage electrical current flows through the resistor 218, inductor 220 and the advance windings 212 of cores A7, A8, A2, A3 and A4, and current flow to the other cores is blocked by diodes 226 and 228. From the advance winding 212 of the input core A7, the current finds parallel paths one through the output winding 214 of that core, and one through the input winding 210 of core A5.

As previously noted, any change in magnetic state of core A7 will give rise to an induced voltage in its output winding 214, hence if the power supply current through advance winding 212 is effective to flip the core from one magnetic state to the other, then a back voltage will be induced in output winding 214 tending to oppose current flow through the output winding and through diode 222 connected thereto. This back voltage across winding 214 and diode 222 permits little if any power supply current flow therethrough, and thus compels the current to pass through diode 224 and the input winding 210 of the core A5, causing that core to change its magnetic state.

Conversely, if power supply current flow through advance winding 212 of core A7 does not cause that core to change its magnetic state, then no back voltage is induced in its output winding 214 and the power supply current from the advance winding is shunted through diode 222 and output winding 214 of core A7 directly to ground, with little if any current flow through diode 224 to the input winding 210 of the core A5. The magnetic state of core A5, therefore, will not be changed under these circumstances.

It is apparent from the foregoing that the initial state of core A7 determines whether the second stage core A5 does or does not change magnetic state during the positive half cycle of power supply voltage; i.e., if core A7 was initially storing a "zero" then the power supply current effectively is shunted to ground through diode 222 and the output winding 214 of core A7; if core A7 was initially storing a "one" then the positive half cycle of power supply voltage is effective to flip the core back to its "zero" state and, in doing so, to induce a back voltage in its output winding 214 forcing the power supply current to flow through diode 224 and input winding 210 of core A5, thus causing that core to flip from its "zero" to its "one" state.

Since the positive half cycle of power supply voltage always is effective to flip the core A7, as well as the other cores A8, A2, A3 and A4, to their "zero" state if they are not already in that state, the core A7 always will be storing a "zero" except when a "one" signal has been applied to its input winding 210 during the power supply negative half cycle just preceding the positive half cycle under consideration. This input signal to core A7 may be from an arithmetic or other logic element constituting the input to the full word adder, and is synchronized with the power supply in any conventional manner as by common connection to the alternating voltage power supply.

During each negative half cycle of the power supply alternating voltage, current flows through the advance windings 212 of the center cores, A1, A5, and A6 and then is either effectively shunted to ground through the output windings 214 of those cores or is made to pass through the input windings 210 of the following cores, depending on whether a "zero" or a "one" was shifted into these cores during the preceding positive half cycle of supply voltage.

As noted above, two full length serial words in digital form, are entered simultaneously in cores A7 and A8. These words are added together and their sum is provided as an output from core A3. By means of the "exclusive or" circuit between cores A7, A8 and core A5, that is a double inhibit, a partial sum digit is formed in core A5. Because it is a double inhibit circuit, if a pulse is being transferred from core A7 and core A8 at the same tme, the transfer to core A5 will be inhibited by the pulse in each of cores A7 and A8 and no pulse will be stored in core A5. However, should a pulse occur in either core A7 or A8 it will be stored in core A5. The output of core A8 is also used to drive the input winding of the core A6. Thus, a pulse appearing simultaneously in both A7 and A8 will be inhibited with respect to A5, but will be shifted into core A6 from A8. The output of core A6 to core A4 is inhibited by the output of core A5. The output of core A5 is used to drive the core A3. Thus, if a pulse appears in both A5 and A6 simultaneously, there will be no input to A4 but there will be an input to A3. An extra winding 230 is provided on core A1, which is the input winding to core A1 from core A4. In this manner core A1 is provided with two input windings, 210 and 230, so that a pulse may be shifted into it from either core A2 or core A4. The cores A1 and A2 form a carry circuit, which is cleared whenever there is a pulse output from core A3. It will be noted that cores A1, A5 and A3 form an "exclusive or" circuit, such that a pulse simultaneously in both A1 and A5 will not be shifted to A3. However, the pulse from A1 would be shifted to A2, to provide the carry. On the next half cycle this pulse would be shifted from A2 back to A1. Then on the following half cycle the pulse would be shifted to A3, assuming there was no pulse at that time in core A5. When the pulse is shifted out of A3, the carry circuit A1, A2 will be cleared.

Figure 5:
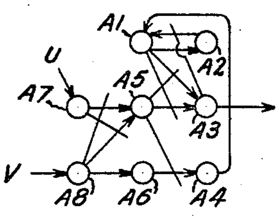
FIGURE 5 is a diagram of the word adder of FIGURE 4, illustrating the symbolic notation which is utilized in FIGURES 6–10.

The adder circuit shown schematically in FIGURE 4 is shown in symbolic notation in FIGURE 5, wherein each of the cores is provided with the same numbers as set forth in FIGURE 4. The lines with the arrows indicate one core feeding or driving the input winding of another core, whereas the lines which cross the arrowed lines are used to indicate an inhibit. Thus it can be seen that core A7 is provided with an ouput line to core A5. Core A8 is provided with an arrowed or output line to each of cores A5 and A6. To indicate core A5 as an "exclusive or" circuit, lines are shown from core A8 crossing the arrowed or output line of core A7 and a line is shown from core A7 crossing the arrowed line from core A8 to core A5. If there is an output signal from core A8 it will inhibit any output from core A7; in a similar manner, if there is an output from core A7 it will inhibit the output of core A8 to core A5. It will be understood, that by inhibit it is meant that the signal out of the core, A7 for example, will not be allowed to enter the input circuit of the driven core, for example core A5.

As an example of the operation of the circuit disclosed in FIGURES 4 and 5, assume that a word V, which will be entered in core A8 is expressed in digital form as 0011, is to be added to a word U, entered in core A7, and expressed in digital form as 0010. The digital sum of these two words is 0101 and will be brought out of the adder at the output of core A3. As the words U and V are entered into cores A7 and A8 respectively, the first signal to the input windings of these cores will be a pulse indicating a 1 on the input winding 210 of core A8 and no pulse on the input winding 210 of core A7 indicating a 0. The pulse on the input winding 210 of the core A8 sets this core to its "one" state. A positive clock pulse, being applied to the advance winding 212 of the core A8, will return the core to its "zero" state, causing a back voltage to be generated in the output winding 214 of the core A8. This back voltage compels the clock current to be fed to the input windings of both cores A5 and A6, since there will be no inhibiting of the signal from core A8 to A5, due to the lack of signal in the core A7. The next input pulse to cores A7 and A8, during the negative half cycle of the clock cycle, will be pulses indicating a 1 in each of words U and V. At the same time the output pulse from core A6 to A4 will be inhibited, since there is an output pulse from core A5 to core A3. Thus, as the two signal pulses of the second numbers of the words U and V are applied to the input windings of the cores A7 and A8, only one pulse is applied to the cores A3 and A4. This is a pulse to the input winding of the core A3, since the input to the core A4 was inhibited by the signal output of core A5.

During the next positive half of the clock cycle, the output winding of A3 provides an ouput pulse indicative of a 1. The output winding of core A7 does not provide a signal to core A5 since it is inhibited by the output signal from the core A8. However, the core A8 does provide an input signal to the core A6. During the negative half cycle no signal is applied to either core A7 or A8 since the next digit in the digital numbers being added is a zero. Since there was no signal on core A5, no signal is applied to core A3. The signal on the core A6 is applied to the core A4 indicative of a numeral 1. During the next half cycle the signals from the cores A8 and A7 are applied to cores A5 and A6. However, since both of these were zeros no input pulse is applied to either of these cores. The 1 signal which is on the core A4 is applied to the core A1, thereby setting this core. The output of core A3 is zero since there is no signal present in the core.

During the next half cycle, zeros are again applied to the input windings of the cores A7 and A8, that is no signal. Also, the core A1 provides a 1 signal to the input windings of both the cores A2 and A3. During the next half cycle no signals are applied to A5 and A6 since none was present in cores A7 and A8. No signal is applied to core A1, since there was no signal in core A4 and the signal from core A2 back to core A1 is inhibited by the output signal from the core A3. The core A3, of course, provides an ouput signal indicative of 1. At this point there are no signals remaining in the adder and during the next full cycle no signal will come out of the adder, therefore indicative of a 0.

Thus it can be seen that the output from core A3 has been first a 1, a 0, a 1 and another 0. This is the total, the sum of the two words U and V which were entered into cores A7 and A8. Of course, it will be understood that the word actually comes out of core A3 backwards, that is the least significant digit comes first, but it is readily read as the digital number 0101. From the above it is believed to be clearly evident how the various adders set forth in the block diagram of FIGURE 3 of this application operate to add digital words together and provide the correct output sum.

Figures 6, 7:
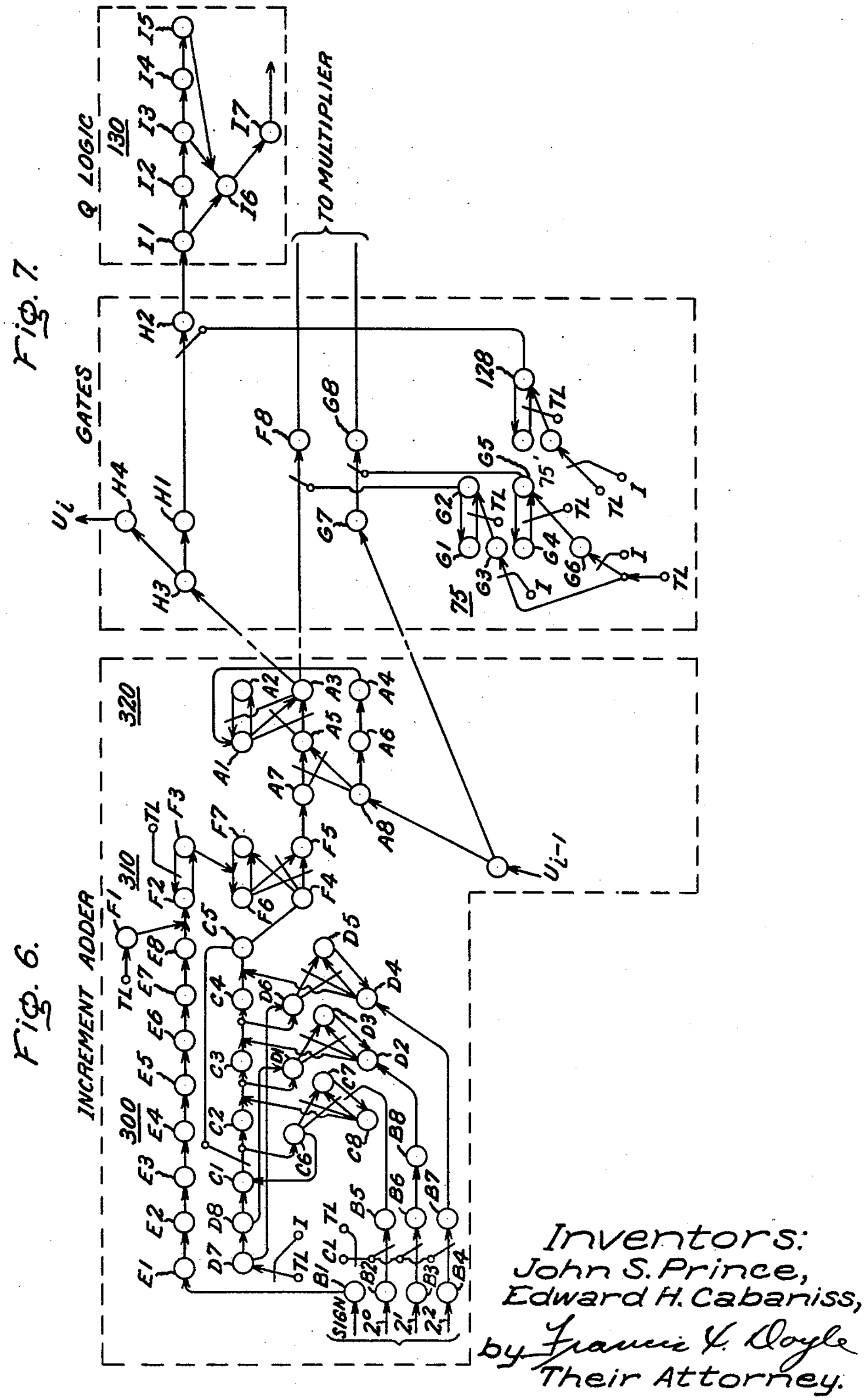
FIGURE 6 is a diagram, utilizing the symbolic notation of FIGURE 5, of one form of an increment adder as used in the computer of FIGURES 2 and 3.
FIGURE 7 is a similar diagram of control or gate circuits and showing one form of a dividing circuit which may be used in this invention.

FIGURE 6 discloses an increment adder which comprises a serial increment decoder 300, a complementer 310, and an adder 320. In the block diagram of FIGURE 3, the various decoders are shown as separate blocks for a better understanding of computer components. The function of the increment serial decoder 300 is to decode the optimum increment, which is received from the random access memory 70, into a full word which is the actual binary number indicated by the optimum increment. This binary word, indicative of the optimum increment selected from the random access memory, is then placed in the adder 320 as one of the words which the adder will combine, and provide the sum thereof, in the manner previously discussed with reference to FIGURES 4 and 5. The other input to the adder may be the previous value of one of the system variables, for example, $U_{i-1}$. By means of the increment adder the increment selected from the random access memory is added to the system variable to provide an updated value, for example, a new value of U. Of course, the increment being added to the system variable may be an increment other than the latest increment of such system variable. It will be understood that the complementer 310 provides the necessary word, positive or negative, to the adder 320. Obviously, the serial increment decoder and the complementer must provide the decoded increment to the adder at the same time as the system variable to which the increment is to be added is placed into the adder. This timing function is provided by the computer clock, the various time lines, and the instructions.

The operation of the increment adder disclosed in FIGURE 6 will now be described. As shown in FIGURE 6, the increment adder includes a decoder 300 which comprises a counting circuit utilizing the five cores labeled C1–C5 and including the three flip-flop circuits comprising cores C7, C8, the cores D2, D3 and the cores D4, D5. These three flip-flop circuits are pulsed by the counting circuit through the cores C6, D1 and D6, respectively. The counting circuit is preceded by two cores labeled D7 and D8, these cores being utilized to provide the proper timing to the circuit. At the beginning of the decoder operation a time line (TL) provides a starting pulse to the core D7 which is transferred to D8 and then into C1. From C1 the pulse is provided to two separate cores, being fed into core C2 and core C6. The pulse, fed to core C6, is further fed to the flip-flop C7 and C8, starting in core C7. Further, in order to provide a constant stream of pulses to the counter circuit, the cores C1 and C6 are arranged in the form of a flip-flop circuit such that the pulse in core C6, in addition to feeding the core C7, will also be fed back to the core C1. It will be noted that the circuit from core C2 to core C3 is an "and" circuit and requires a pulse from core C8 to be "anded" with the pulse from core C2 in order to provide an input pulse to the core C3. When the pulse from core C2 is "anded" with a pulse from core C8, an input is provided to the core C3. At the same time an input pulse is provided to the core D1, thereby turning on the flip-flop circuit D2 and D3, by inserting the pulse into the core D3. It will be noted that the pulse from core C3 is only provided as an input to the core C4 when it is "anded" with a pulse provided from the core D2. Considering the pulse from core C3 to be "anded" with a pulse from the core D2, a pulse will be fed to the core C4 and also to the core D6, thereby turning on the flip-flop circuit D4, D5 by providing a pulse to the core D5. Again it will be noted that the core C4 will only provide an input pulse to the core C5 when it is "anded" with a pulse from the core D4. It should also be noted, that at the time a pulse appears at the core C5, this pulse is fed back to the flip-flop comprising cores C1 and C6, providing an inhibit to this flip-flop, thereby turning off the counter.

From the above description it can be seen that a pulse fed into the counting circuit will provide a single output pulse at core C5 upon the 8th count. A pulse being fed from the core C2 to the core C3 will require an extra cycle in order to obtain the pulse necessary from the core C8 to "and" with the pulse from core C2 to provide the input pulse of core C3. In a similar manner the core C3 will only provide an output pulse to core C4 after the flip-flop D2, D3 has been activated to provide an output pulse from core D2. Therefore, the count from core C3 to core C4 will be 4. In a similar manner the core C4 will only provide an output to the core C5 upon being "anded" with a pulse from the core D4 and this will only occur upon the count 8. Therefore, the output pulse from C5, assuming a direct input to the counter, will occur at the 8 count. As shown in FIGURE 6, the pulse from core D7 is also fed to the core D6, and thence to core D5, thereby starting the flip-flop D4, D5. It should also be noted that the cores D4 and D6 form an "exclusive or" circuit. The reason for the feeding of the core D6 to start the flip-flop D4, D5 and the "exclusive or" circuit between D4 and D6 will become apparent in the following description. It is also shown in FIGURE 6 that the pulse from core D8 provides an input to the core D1, thereby starting the flip-flop D2, D3 by an input pulse to core D3. It should also be noted that the core D1 and core D2 form an "exclusive or" circuit, for reasons which will become apparent in the following description.

As shown on the left hand side of the drawing of FIGURE 6, the optimum increment selected from the random access memory is placed into the four cores B1, B2, B3 and B4. The sign of the increment is inserted into the core B1 while the pulses for $2^0$ are inserted in core B2, for $2^1$ are inserted in core B3, and for $2^2$ are inserted in B4. At the beginning of the decoder operation the time line inhibits the clock pulse and allows the increment selected to pass from cores B2, B3 and B4 to the cores B5, B6 and B7. If a pulse appears in the $2^0$ portion of the selected optimum increment, it will be fed from the core B5 to act as an inhibit to any signal being fed from core C7 to core C8 to assure that the flip-flop C7 and C8 is turned off when the counter pulse reaches core C1. A pulse in the $2^1$ portion of the increment selected is fed from the core B6 to the core B8, while a pulse in the $2^2$ portion of the selected increment will be fed from the core B7 to the core D4. It will be noted that the pulse fed from D7 to D6 is fed at the same time as any pulse from the core B7 to the core D4. Thus, with a pulse in the $2^2$ portion of the selected increment, when the core D6 attempts to feed the core D5 it is inhibited by the output of the core D4. In the same manner, the output of core D4, attempting to feed core D5, is inhibited by the output of the core D6. Therefore, no signal is provided to the core D5. The output from core D4 which could be "anded" with the output from core C4 has no effect since, at this time in the counter cycle, there is no pulse at core C4. It is believed that the reason for the pulse feeding to the flip-flop D4, D5 through the core D6 will be obvious since, if there is a pulse in the $2^2$ portion of the selected optimum increment, it is desired that the proper delay be provided by the flip-flop D4, D5 and the cores C4 and C5. In order to provide this, it is necessary that the pulse from D7 be fed from the core D6 at the same time as a positive pulse from core B7 to core D4 as noted above. In a similar manner, should a pulse be in the $2^1$ channel, it is delayed one count in core B8 and is then fed to core D2 at the same time as the pulse from the core D8 is fed to the core D1. When these pulses attempt to feed core D3, each will be inhibited by the output of the other due to the "exclusive or" circuit. Therefore, no pulse will be fed to D3. As before noted with reference to core C4 and D4, the output of core D2, to be "anded" with the output of core C3 will be ineffective, since the pulse through the counter has not yet arrived at core C3. From the above it is believed clear the manner in which the serial increment decoder operates in order to provide the desired serial word output from core C5, which is the binary equivalent of the increment selected from the increment selector and inserted into the serial decoder. For example, should the selected increment be positive, and have only a pulse in the $2^0$ channel, that is, 0001, the operation would be as follows. At the time the pulse goes from core B5 to inhibit the flip-flop C7, C8, the starting pulse would go from core D7 to core D8. In the next half cycle the starting pulse would go from core D8 to core C1. In the next half cycle the starting pulse would go from core C1 to core C2 and also to core C6. In the following half cycle the output from core C6 would go to core C7 of flip-flop C7—C8, while the output of core C2 would have no effect on core C3. The pulse from core C6 would also be fed back to core C1. On the following half cycle the pulse from core C1 is again fed to cores C2 and C6. In the next half cycle the pulse in core C2 would be fed to core C3, being "anded" with the pulse from core C8 of the flip-flop C7 and C8. Since there was no signal in the $2^1$ or $2^2$ portions of the increment selected, the flip-flops represented by D2, D3 and D4, D5, would both be running. Therefore, the pulse from core C3 would be "anded" with a pulse from core D2 and pasesd to core C4. In a similar manner, the pulse from core C4 would be "anded" with a pulse from the core D4 and would pass through the core C5. As hereinbefore pointed out, at the time the pulse leaves the core C5 it also is utilized to inhibit the flip-flop represented by cores C1 and C6, thereby turning off the counter circuit, and preventing any more pulse from leaving the counter circuit. Therefore, the serial increment decoder would provide the numeral 2 in binary form out of the counter into the complementer, the numeral (considering eight digits) being 00000010. It is to be remembered that the increment is the power of the radix 2. Thus a "one" digit in the $2^0$ portion of the increment indicates $2^1$ as the number represented by the increment. Of course, $2^1$ equals the numeral 2, and is expressed in binary form as above.

Of course, it will be understood that the sign of the increment which is fed into core B1, is then fed to the shift register comprising the eight cores labeled E1–E8. If the sign of the increment is negative, that is, there is a pulse in the sign core B1, this pulse will be fed to core E1 and will thence move successively through the cores E1–E8. At the time that a pulse is fed to core E8, a time line pulse is fed into the core F1. Thus, assuming there is a negative sign to the increment, the time line pulse in the core F1 will be "anded" with the pulse from the core E8, thereby transferring this pulse to the core F2 of the flip-flop circuit F2, F3 of the complementer 310. The time line indicated as inhibiting the pulse from core F3 to F2 is merely provided at this point to insure the clearing of the flip-flop F2, F3 prior to the insertion of the sign from the serial decoder, in the event that the flip-flop is already running. This, of course, is necessary to prevent the complementer from complementing the number coming out of the decoder if the number is actually a positive number. As shown, the decoded increment is fed from the core C5 to the core F4 of the complementer. The operation of the complementer, as will be well understood by those skilled in the computer art, is to provide the complement of the number being inserted into the complementer in the event that the sign of the number should be changed. Of course, the complement of a number is merely the reverse of all digits of the number after the first pulse indicating a "one" digit. That is, considering the eight digit binary number indicating 6, which is 00000110, the complement of this number is 11111010. Thus, as will be understood, the function of the complementer is to change all of the digits in the number when the number is negative, to the opposite digit, after the first 1 appearing in the number.

Considering the binary number 2(00000010) being fed into the complementer 310 from core C5 and considering this to be a negative number, the following will be the action of the complementer. The negative sign from core E8 is "anded" wth the time line from core F1 into Core F2, thereby starting the flip-flop F2, F3. At the same time the binary number 2 is fed into the core F4. The first digit being a zero, no pulse will appear in core F4, none will be fed from core F4 to F5 or F7. Therefore, the output from F5 will be a zero. Inasmuch as there is no pulse being fed from F4 to F7, there is no pulse to be "anded" from F7 and F3 into core F6. Therefore, no pulse appears in core F6. The next digit, which will be a pulse indicative of the digit 1, will appear in the core F4. This pulse will be fed both to core F5 and to F7. As core F5 provides an output, a pulse indicative of the digit 1, the positive pulse in F7 is "anded" with the pulse in F3 to thereby provide a pulse in core F6. Since the next digit is a zero, there will be no pulse in F4. A pulse will appear in F6 from the "anding" of the pulses in cores F7 and F3. Therefore, the next digit will be from F6 to F5 and will provide an output from F5 of a 1 instead of the zero, therefore being the complement of the number 2. Of course, it will be obvious that since the flip-flop F2, F3 is running and since F6 will continually feed back to F7 as it feeds to core F5, that as long as the zeros remain in the digit being fed from cores C5 to core F4, core F6 will continue to provide a pulse to core F5 and therefore, provide an output from the complementer indicative of a digit 1, that is the complement of the zeros being fed to core F4. Due to the double inhibit or "exclusive or" between cores F6, F4 and F5, should a pulse appear in core F4 indicative of the digit 1, this pulse will not be fed to core F5 due to the inhibiting of the pulse from core F6. In a similar manner, the pulse from core F6 will not be fed to core F5 due to the inhibit from the core F4. Therefore, when a 1 appears in the digit after the first 1 goes through the complementer, the remaining 1's will be inhibited, thereby providing a zero output, which is of course the complement of the digit 1.

The output from the complementer 310 is fed into the adder 320 into core A7. At the same time the number to be added, such as for example, $U_{i-1}$, will be fed into the core A8 of the adder. These words will be added together in the same manner as has been previously described with references to FIGURES 4 and 5 of the drawing. The output of the increment adder will be taken from core A3, in the same manner as previously described with respect to the adder shown in FIGURES 4 and 5.

As will be noted from FIGURE 3 of the drawing, the output of the various increment adders, in the computer of this invention, can be provided to a number of places. For example, the output of increment adder 68 is fed back to the top of the U drum 12 over the line 71 and is also fed into a gate device 75 from whence it is fed to a multiplier 76. In order to indicate some of the methods of feeding the output of the increment added throughout the computer of this invention, the output of core A3 in FIGURE 6 is shown as being provided to a number of cores in FIGURE 7, FIGURE 7 providing a showing of a means of gating the various words utilized in the computer and also providing a showing of the "Q" logic circuit 130 used in division.

Considering now FIGURE 7 and especially the gate 75, through which the output of adder 320 of increment adder 68 is gated to the multiplier 76, the gate 75 is shown as comprising three cores G1, G2 and G3, the cores G1 and G2 forming a flip-flop circuit. A pulse is provided in core G3 and then to core G2, turning on the flip-flop G1, G2. As long as the flip-flop G1, G2 is running an inhibit is placed on the output of the core A3 to core F8, which is fed to the multiplier 76. Therefore, with the gate 75 closed, the output of the increment adder cannot be sent to the multiplier 76. It will be noted that the gate 75 is operated by a time line pulse being fed to the core G3. This time line pulse to core G3 may be inhibited by an instruction from the instruction drum 18, labeled I in FIGURE 7. The instruction need only occur at the time of the time line pulse. If this instruction is provided inhibiting the time line pulse to core G3, then the flip-flop circuit G1, G2 will not be started and therefore, the gate from increment adder 68 to the multiplier 76 will be open, allowing the output of the increment adder to be fed to the multiplier. It should be noted that a further time line is provided to the gate 75. This time line is shown as inhibiting the flip-flop G1, G2, it being understood that this is provided in order to be certain that the flip-flop G1, G2 is not running at the time of the time line pulse and the instruction into G3. Were the flip-flop G1, G2 running, then the instruction preventing the time line pulse from being fed to core G3 would not be effective to open the gate 75 allowing the output of the increment adder 68 to be fed to the multiplier 76.

A second gate shown in FIGURE 7 is a gate 75' by which the old value of $U_{i-1}$ may be fed directly from the U track 12 to the multiplier 76. The gate 75' is comprised of cores G4, G5 and G6 and its operation is the same as gate 75. It will be noted that the gate 75' provides an inhibit to the $U_{i-1}$ signal which is fed through cores G7 and G8. Of course, when the gate is opened by an instruction from the instruction track 18, the word $U_{i-1}$ is fed directly from the U track 12 into the multiplier 76. A third gate 128 is shown in FIGURE 7, providing a gate to the pulse being sent from cores H1 to H2. This gate will operate at an instruction to remove the inhibit from the line between H1 and H2 and, therefore, allow the value being fed from the increment adder to be fed into the "Q" circuit 130 as shown in FIGURE 7. The operation of this gate is similar to that previously described for gate number 75. It should also be noted that the value taken from the increment adder 320 may be fed directly to cores H3 and H4 and then back to the top of the appropriate track in the manner shown in FIGURE 3, where for example, the value from the increment adder 68 is fed over the line 71 back onto the U track 12.

The "Q" logic circuit 130 performs the function of selecting an optimum increment of the divisor, which has been placed on the V track (see FIGURE 3). The divisor is fed from the V track 16 to a gate 128 and then into the "Q" logic circuit 130. The circuit for selecting this optimum increment is shown in FIGURE 7 and comprises 7 cores labeled I1–I7. If the gate 128 has been opened, that is the inhibit removed from cores H1 to H2, thereby allowing the pulses to pass from cores H1 to H2, then the numeral from the V track will be fed from core H2 into the "Q" logic circuit 130. However, in the use of division, the optimum increment which is selected by the "Q" logic circuit is utilized in the increment selector to reset the selection counter, as will be further understood later on in this specification when the description of the increment selector is provided. Therefore, the output of the "Q" logic circuit from core I7 goes through a shift register 132 and then into the increment selector as shown in FIGURE 3. The function of the "Q" logic circuit shown in FIGURE 7 is to start the counter of the increment selector at the proper time. It will be understood that an optimum increment, that is a power of the radix 2, is a single digit at a given significant point in a word. For example, $2^2$ is an optimum increment and it is shown in binary form by 00000100. Thus, the function of the "Q" logic circuit is to provide this significant digit at the proper place within the binary word, that is to provide the proper pulse at the most significant point in starting the counter of the increment selector.

In the operation of the "Q" logic, a number fed from core H2 into the "Q" logic circuit 130 goes into core I1 and assuming a pulse, indicative of a "1" digit, this pulse will be sent to both I2 and I6. As the next digit arrives from H2, the pulse in I2 and I6 is sent to I3 and I7, respectively. Then, as the digit, again assumed as 1, in I1 goes to I2, the previous pulse comes out from I7 and that which was in I3 is put in I4. When the next digit leaves core H2 to core I1, the pulse in I2 goes to I3 and the pulse in I4 goes to I5. Assuming all three digits now entered into the "Q" logic circuit 130 are "one's," than a "one" pulse will be provided to I6. However, should only the first two pulses entering the "Q" logic circuit 130 have been "one" digits and the third a "zero" digit, a pulse will still appear in I6, since the outputs of I3 and I5 are "anded" into I6. In this manner, the third digit out of the "Q" logic circuit will be a "one" digit, even though only the first two digits of the word into the "Q" logic were "one" digits. Therefore, the "Q" logic circuit will provide a "one" digit in the third significant place, indicative of $2^2$ or 4, even though the word entering into the "Q" logic circuit was only the numeral 3(011) in binary form. As will be explained in describing the increment selector, the last positive pulse, that is the most significant digit in the word from the "Q" logic circuit is the only one which is of importance to the increment selector. From the above it can be seen that the "Q" logic circuit will provide an indication of a "one" digit at its output whenever either the two preceding digits of the word entering the "Q" logic circuits are "one" or when the last number entering the "Q" logic circuit is a "one." Thus, in effect since only the last "one" digit leaving the "Q" logic circuit is utilized, the effective output of the "Q" logic circuit is an optimum increment, that is a "one" digit in the most significant portion of the numeral, indicative of the closest integral power of two by which the numeral should be divided.

Figure 8:
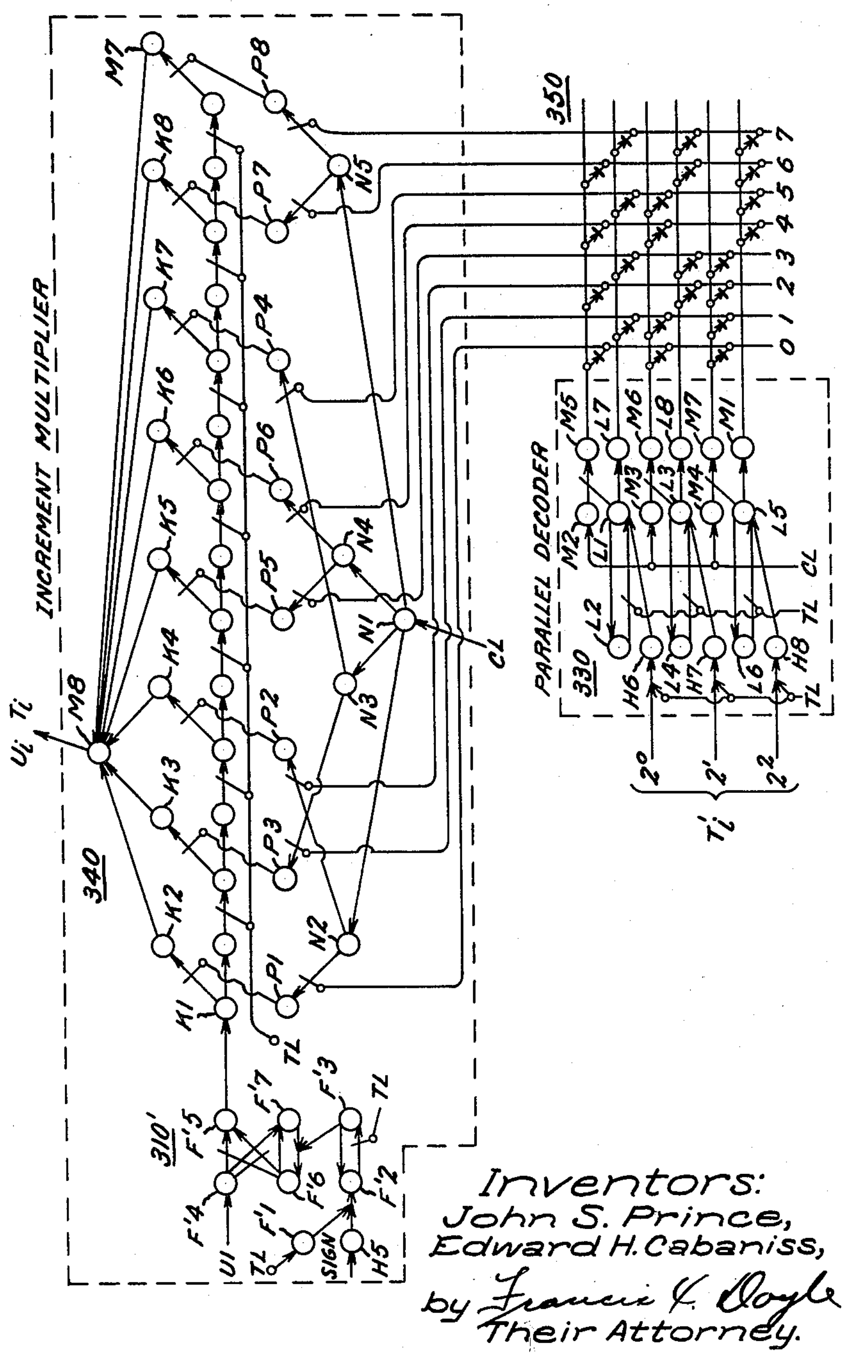
FIGURE 8 is a similar diagram of one form of an increment multiplier.

FIGURE 8 is a showing of an increment multiplier, which may be utilized in this invention to provide the multiplication of a number by one of the optimum increments which is selected from the random access memory. The increment multiplier is comprised of a complementor 310', a parallel decoder 330, and a shift register 340. The numeral or word to be multiplied, for example, $U_1$, is brought into the increment multiplier at the beginning of the complementer in the core F'4. The sign of the increment, which is brought from the random access memory, is brought into the complementer 310' through core H5 and into core F'2, where it is "anded" with a time line signal from core F'1. It will be recognized, that the complementer 310' is identical to the complementer 310 shown in FIGURE 6, and will operate in the same manner to complement the word $U_1$, should the sign of the increment, by which the word $U_1$ is being multiplied, be negative. It is not believed necessary to further describe the complementer 310', it being apparent that the word, $U_1$, will be directed from the core F'5 of the complementer 310' into core K1 of the shift register 340.

The value of the increment, by which the word is to be multiplied, will be brought to the parallel increment decoder 330, into the cores H6, H7 and H8. Any pulse of the selected increment, which would indicate a "one" digit in the selected increment, will be "anded" with a time line pulse so as to enter core H6, H7, H8 at the proper time. Any "one" digit appearing in cores H6, H7 and H8 will be fed to the cores L1, L3 and L5 of the flip-flops L1—L2, L3—L4, and L5—L6. Thus, should the increment being inserted into the parallel increment decoder be the increment 111, a pulse will be presented in each of cores H6, H7 and H8 and thereby start all three of the flip-flop circuits. At the time of the "anding" of the time line to insert the increment into the cores H6, H7 and H8, a time line pulse is also provided, inhibiting each of the flip-flop circuits, so as to clear these circuits prior to the insertion of the increment therein. The output of the flip-flops L1—L2, L3—L4, and L5—I6, are directed, respectively, to the cores L7, L8, and M1.

Also, in the parallel increment decoder, a clock pulse is provided to the cores M2, M3 and M4. These clock pulses will be fed from the cores M2, M3, M4 to the cores M5, M6, and M7, respectively. It will be noted, that when a pulse appears in the flip-flop L1—L2, that the pulse, in addition to going to the core L7, will also inhibit the clock pulse going from core M2 to M5. The same type of inhibit circuit is provided from each of the other two flip-flop circuits to the respective clock lines which are associated therewith, as is clearly shown in FIGURE 8. Thus, it can be seen that when an increment is provided into the parallel increment decoder 330, that the lines $2^0$, $2^1$, and $2^2$ which are provided with a positive pulse, indicative of the power of 2 by which the number into the increment multiplier is to be multiplied, that these channels will provide an output and will inhibit the associated clock line to prevent an output from such clock line. However, for those lines of the increment which do not have a pulse, then the associated clock line will provide an output pulse. The output pulses from the parallel increment decoder are fed into a diode matrix 350 and thence, into the associated circuitry of the shift register 340 to provide the desired multiplication.

It will be noted that the shift register 340 is provided with 8 output cores labeled K2, K3, K4, K5, K6, K7, K8 and M7. Each of these output cores is fed into a core M8, in an "or" circuit and, as indicated, the output from core M8 is the desired multiplication. It will be noted that each of the inputs to cores K2, K3, K4, K5, K6, K7, K8 and M7 is provided with an inhibit line which comes from a clock pulse CL feeding a core N1. The core N1 in turn, feeds a series of cores N2, N3, N4 and N5. The core N2 is utilized to feed a core P1, which provides the inhibit to the input line to the core K2. Core N2 also feeds core P2 which provides an inhibit to the core K4. Core N3 feeds core P3, which provides the inhibit to the input of core K3, and also, core N3 feeds core P4, which provides the inhibit to the input of core K7. Core N4 feeds the core P5 and P6, core P5 providing the inhibit to the input of core K5 while core P6 provides the inhibit to the input of core K6. The core N5 feeds the cores P7 and P8, which, respectively, provide the inhibits to the inputs of core K8 and core M7. Thus, it is seen that in the normal operation of the increment multiplier, a clock pulse is provided which inhibits each of the outputs from the shift register 340.

In order to provide the desired multiplication, the increment from the parallel increment decoder 330 is fed through the matrix 350 and is utilized to inhibit one of the clock lines which is inhibiting an output line. In this manner, one of the output lines will not be inhibited, thereby allowing the multiplied word to be fed to the output core M8. For example, should there be no increment inserted into the parallel increment decoder, that is a series of zeros being entered into the parallel increment decoder, this would indicate the multiplication of the number $U_1$ for example, by $2^0$, which of course is multiplication by 1. In this instance, it will be noted, that there will be no pulse in the flip-flops L1—L2, L3—L4 and L5—L6. Therefore, there will be no inhibit placed on the clock pulses going from cores M2 to M5, M3 to M6, and M4 to M7, so that a pulse will be provided out of each of cores M5, M6 and M7. It will be noted, that each of these pulses will be fed through a diode in the first line labeled 0 of the matrix 350, these pulses together being sufficient to provide an inhibit to the output of core N2 to core P1. By inhibiting the output of core N2 to core P1 the inhibit, which is placed on the input of core K2 by the output of core P1, will be removed. This will allow the word, for example $U_1$, to go directly from core K1 of the increment multiplier to core K2 and thence, out of core M8.

As a second example, consider that the input to the parallel increment decoder is 111, indicating multiplying by the $2^7$, or 128. The word into the increment multiplier would have to be delayed 7 pulses, the power of the multiplier, before being sent out of core M8, to provide the desired multiplication. In this example, it will be noted that each of the flip-flops L1—L2, L3—L4, and L5—L6 will be running, therefore, inhibiting each of the associated clock pulses. An output pulse will be provided from each of cores L7, L8 and M1 into the diode matrix 350. These three pulses will flow through the three diodes noted in line 7 of the diode matrix 350, these pulses being sufficient to provide an inhibit to the signal or pulse from core N5 to core P8. By inhibiting the pulse from core N5 to P8, the inhibit provided by core P8 to the input of M7 is removed. Removing the inhibit from the input of core M7 allows the word entering the increment multiplier to be taken out at M7, and then fed to M8, and out of the increment multiplier. Obviously, this provides a delay of 7 pulses of the word, thereby effectively performing the multiplication of the word by $2^7$. It is not believed necessary to further describe by example the action of the increment multiplier, it being readily apparent to those skilled in the art that the increments placed into the increment decoder, will provide the necessary inhibit over one of the lines of the diode matrix 350, to prevent an inhibit from being placed on one of the output circuits. The removal of this inhibit, of the particular output circuit, will effectively delay the word into the increment multiplier the number of pulses equal to the power indicated by the increment, thereby effectively multiplying the word by 2 to that power. From the above it is believed that the operation of the increment multiplier in the computer of this invention will be readily understood by those skilled in the art.

Figure 9:
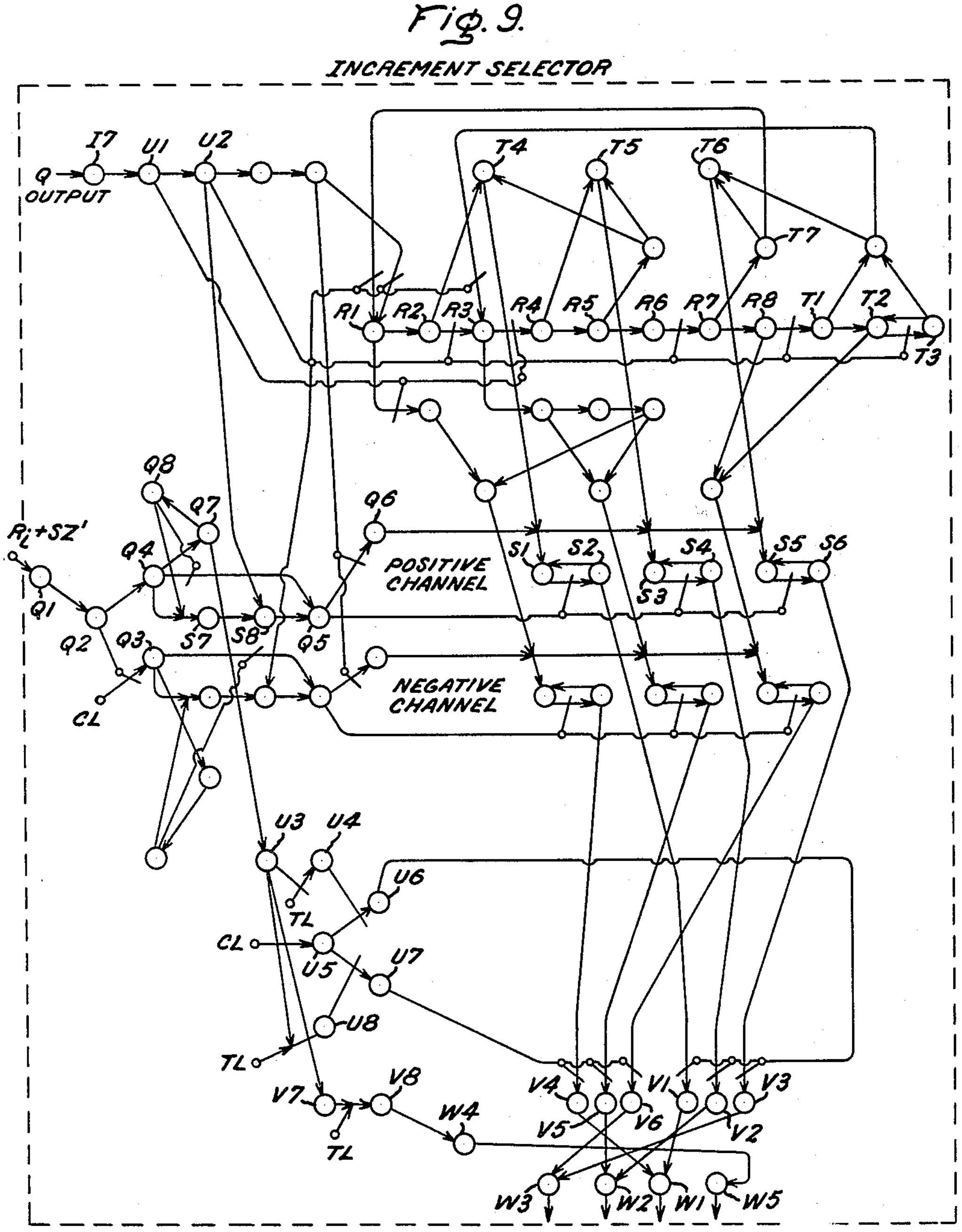
FIGURE 9 is a similar view of one form of a variable increment selector.

FIGURE 9 is a disclosure of the increment selector of this invention, utilizing the symbolic notation of FIGURE 5 to show the operation of it. As previously pointed out the function of the increment selector is to examine the output of the arithmetic element and select the closest integral power of 2 which approximates the magnitude of this number. It also scales the number by an arbitrary integral power of 2, if desired, and then sends the increment selected to the random access memory. As shown in FIGURE 9, the increment selector receives the value $R_i+SZ_i'$ at the core Q1. Since the word may be either positive or negative, and since in the serial operation of the machine the sign digit is the last bit to be examined, it is necessary to provide two channels in the increment selector. One channel assumes that the number is positive while the other channel assumes that the number is negative. When the sign digit becomes available the proper increment selector output is chosen for storage in the random access memory and the other increment selected is discarded because it is meaningless.

At first view, the selection process appears to be a simple one of counting the digits in the number and then assigning the count of the most significant digit as the exponent of the increment. For example:

| Binary Word | Count | Increment |
|---|---|---|
| 00000001 | 0 | $2^0$ |
| 00000010 | 1 | $2^1$ |
| 00000100 | 2 | $2^2$ |
| 00001000 | 3 | $2^3$ |

The count must start at 0 as noted above. If this count is made in a binary counter, the count is a desired increment coded for storage. However, since the binary word may take on any value it is not always a good approximation to let the increment equal the magnitude of the most significant digit. For example, if the number to have its increment selected and stored were 00001111, the increment to be stored would be $2^3$. But this would be a storage of 8 for the numeral in binary form 15. Since the principle of the optimum increment selector is to choose the closest increment, the transition point in taking the smaller or the larger of two possible increments is of primary concern. It is actually taken midway between the values of the increments by the increment selector. For example, consider the following table:

| Decimal No. | Binary No. | Increment |
|---|---|---|
| 0 | 0 . . . . 00000. | $2^0$ |
| 1 | 0 . . . . 00001. | |
| 2 | 0 . . . . 00010. | $2^1$ |
| 3 | 0 . . . . 00011. | |
| through | through | $2^2$ |
| 5 | 0 . . . . 00101 | |
| 6 | 0 . . . . 00110 | |
| through | through | $2^3$ |
| 11 | 0 . . . . 01011. | |
| 12 | 0 . . . 001100. | |
| through | through | $2^4$ |
| 23 | 0 . . . 010111. | |

As will be noted from the above table the transition point to the higher count occurs where there are two successive ones. Thus in the increment selector, the logic for developing a store signal takes this into account, and a store signal is developed if either the current digit is a 1; or the two preceding digits were both ones. Of course, if all three digits are 1 the store signal will still be developed.

In an ordinary binary word it is possible that several separate store signals can be developed. On each of these signals, the latest count is sent to storage. Since it is not until the final digit that the sign of the word is determined, a temporary or buffer storage is used between the counter and the random access memory. To avoid any possibility of error this temporary storage is cleared by the store signal immediately before the current count is sent into the temporary storage. Since both channels are being utilized until the sign of the number is sent into the increment selector, both channels will have the increment in temporary storage. Upon the recognition of the sign digit, the contents of the temporary storage unit will be sent to the random access memory. In setting up the negative channel, it will be understood that the word is first complemented and then of course is treated as a positive number. Thus it will be noted that in one channel the sign digit will be a 1 while in the other it will be a 0. As the selection logic is based on the word being positive it is the contents of the zero channel which is desired. Thus the 1 digit will automatically clear the unwanted temporary storage unit and the increment of the other channel will be sent to the random access memory. Since the increment is sent to the random access memory when the unwanted temporary storage unit has been cleared and before the counter can be read again no error can result, but only the desired increment which is in the zero channel is available for transmission.

Referring again to FIGURE 9 for an example of the operation of the increment selector as hereinbefore detailed, the word $R_i+SZ_i'$ is placed in core Q1 and from there it is passed into core Q2 which, as is shown, inhibits the clock input to core Q3, thereby generating the complement of the word $R_i+SZ_i'$ in core Q3. Core Q2 also is fed into core Q4. Core Q4 is the first core of the positive channel and core Q3 is the first core of the negative channel, operating on the complemented word. From this point, the operation of both channels is similar, and therefore, only the positive channel will be described.

The pulse path for a 1 in the core Q4 is to Q5 then to Q6 and from there to an "and" circuit into cores S1, S3 and S5, which are the input cores of the flip-flops S1—

S2, S3—S4, and S5—S6 of the temporary storage. Also from core Q4 a "1" will go to core Q7 and then to Q8 where the output is "anded" with the next digit of the word coming from Q4. The existence to two or more consecutive 1's coming from core Q4 will cause a pulse to be transferred to core S7 by virtue of the "anding" pulse being transferred from core Q8 in conjunction with the "one" signal from core Q4. From core S7 the pulse is transferred to core S8, thence to core Q5 into core Q6, the output of core Q6 causing the transfer of the count into the temporary storage represented by the input cores of the flip-flops, as noted above. A second output line from core Q5 clears the three temporary storage flip-flops at the same time the signal is being transferred to core Q6, thereby clearing the temporary storage flip-flops just prior to the storage of a later count, by inhibiting the appropriate flip-flop transfer lines.

The count to be stored in the flip-flops represented by cores S1—S2, S3—S4, and S5—S6, is generated by the advance of a single pulse in the shift register comprising the cores R1 through R8, and T1, T2 and T3. Cores T2 and T3 form a flip-flop, which allows the shift register to hold its count. The $2^0$, $2^1$, and $2^2$ digits of the count are generated in the cores T4, T5 and T6 respectively by their connections to the shift register as is clearly shown in FIGURE 9. It will be noted that after a pulse is introduced into the core R7 on the next half cycle it goes to core T7 and thence on the next half cycle it is reintroduced into core R1. This enables the counter to count to a maximum of 7 and then to hold this maximum count by feedback from the flip-flop core T3. The count is stored in the temporary storage flip-flops, S1—S2, S3—S4 and S5—S6, under the control of the outputs of core Q6.

The initial pulse into the shift register which starts the core R1 is the output of the "Q" logic circuit 130, and may be either the scale factor which comes from the drum memory, or a divisor, as previously noted. The "Q" pulse branches from the cores U1 and U2 to clear the increment selector by inhibiting the various transfer lines as is indicated in FIGURE 9. The timing of the "Q" circuit output pulse determines the power of 2 scale factor on the examined word, and hence the scale factor of the increment selector output. This is done by allowing the "Q" circuit output pulse to start the count at the appropriate time. Where a number of output pulses are provided by the "Q" circuit, each succeeding pulse will clear the register, and restart at a new count.

After the appropriate increment magnitudes have been stored in the two temporary storage registers, it is necessary to select which of the two indicated magnitudes should be stored in the random access memory. This is accomplished by inspection of the sign digit of the input word. The sign digit of the word is transferred from core Q2 to core Q4, thence to core Q7 and to core U3. The sign is available at core U3 at the same time that the time line pulse is generated into core U4. It will be noted that the clock pulse feeds the core U5 which in turn feeds into cores U6 and U7. The core U6 provides an inhibit to each of the cores V1, V2 and V3, which are the cores which accept the input from the temporary storage flip-flops of the positive channel. The core U7 inhibits the cores V4, V5 and V6, which are the cores which accept the contents of the temporary storage flip-flops of the negative channel. As is shown, the inputs to these cores are normally inhibited by the clock pulse from the cores U6 and U7. If the sign digit is a 1, thereby indicating a negative number, the time line input to core U4 is inhibited, thus causing the input to U6 to continue, and thereby, continue to inhibit the inputs to cores V1, V2 and V3. At the same time the sign pulse from core U3 is "anded" with a time line pulse entering the core U8. The existence of both of these pulses, simultaneously, inhibits the clock pulse to core U7, thereby removing the inhibit from cores V4, V5 and V6. In this manner, the selected increment magnitude of the negative channel is transferred to the cores W1, W2 and W3 and then to the random access memory. At the same cycle, the output from core V7, which is fed by core U3 is "anded" with a time line pulse to core V8, thence to core W4 and finally to core W5, where it provides the indication of the digit sign which is thence transferred to the random access memory. If the sign pulse is a zero that is no signal, then the time line pulse to core U4 is not inhibited and, therefore, the output of core U4 will inhibit the clock pulse to core U6. This will remove the inhibit from the input lines of cores V1, V2 and V3. This will allow the increment to be transferred from the positive channel of the temporary storage into cores V1, V2 and V3. The increment is then transferred to cores W1, W2 and W3 and thence it will be transferred to the random access memory. The above is believed to be a thorough and complete explanation of the operation of the increment selector of this invention. In order to provide a tabular explanation of the above details of the operation of the increment selector two examples are provided in tabular form in which the inputs to the positive and negative channels of the increment selector are shown, first considering an input word of a positive numeral 53 and then considering the input as a negative numeral 53. It will be noted, that where two successive ones appear in the binary equivalent of the numeral 53 that the following 0 is shown with a slant line therethrough and the numeral 1 is shown in brackets. This is merely an indication of what was said before, that where the two proceeding digits are both ones, then a store signal will be developed. These examples are shown in Tables I and II.

Figure 10:
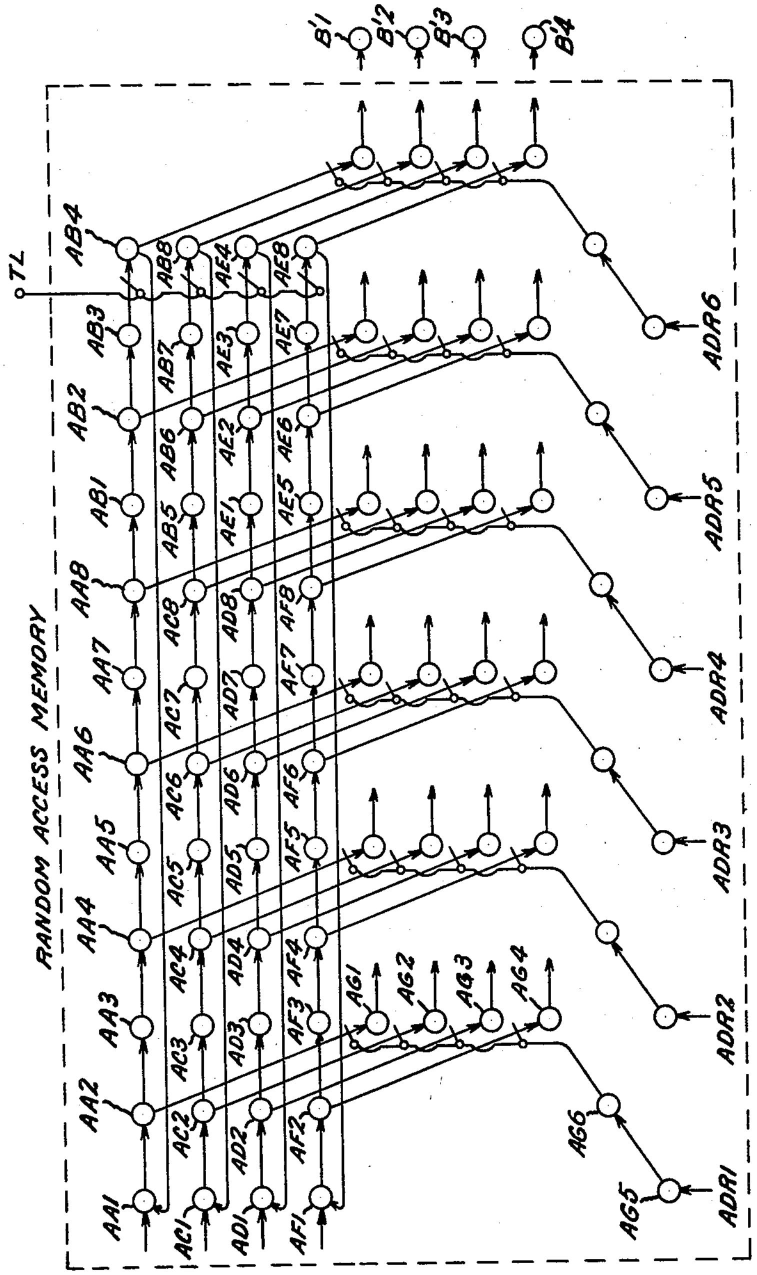
FIGURE 10 is a similar diagram of one form of a random access memory circuit suitable for use in the computer of FIGURE 3.

The random access memory disclosed in FIGURE 10 of this application is the part of the computer which provides the storage for the various optimum increments selected. The actual storage function may be performed by means of core logic units, such as is disclosed in FIGURE 10, or it may be done by means of circulating registers on the drum memory with the addressing of specific increments being performed by core logic units which are a part of the computer arithmetic control. The storage function may also be performed by coincident current core memory planes.

The random access memory of FIGURE 10 is disclosed as a group of core logic units and consists of four, six digit shifting registers. These six digit shifting registers can store six parallel words of four digits each. As shown in FIGURE 10 the first digit channel is composed of cores AA1 through AA8, plus the cores AB1 through AB4.

*Table I*

Input Word=+53=000110101

| Counter | Positive Channel | | | Negative Channel | | |
|---|---|---|---|---|---|---|
| | Digit | Store Signal | Temp. Storage | Digit | Store Signal | Temp. Storage |
| 0 | 1. | Clear | ---------- | 1. | Clear | ---------- |
| | | Store | 0 | | Store | 0 |
| 1 | 0 | ---------- | 0 | 1 | Clear | 0 |
| | | ---------- | 0 | | Store | 1 |
| 2 | 1 | Clear | 0 | $\phi$ (1) | Clear | 0 |
| | | Store | 2 | | Store | 2 |
| 3 | 0 | ---------- | 2 | 1 | Clear | 0 |
| | | ---------- | 2 | | Store | 3 |
| 4 | 1 | Clear | 0 | 0 | ---------- | 3 |
| | | Store | 4 | | ---------- | 3 |
| 5 | 1 | Clear | 0 | 0 | ---------- | 3 |
| | | Store | 5 | | ---------- | 3 |
| 6 | $\phi$ (1) | Clear | 0 | 1 | Clear | 0 |
| | | Store | 6 | | Store | 6 |
| 7 | 0 | ---------- | 6 | 1 | Clear | 0 |
| | | ---------- | 6 | | Store | 7 |
| Store→7 | 0 | ---------- | 6 | 1 | Clear | 0 |

At the "Store," only the positive temporary storage unit contains an increment. Thus: $+2^6$ or 0–110 is read to the random access memory.

*Table II*

Input Word=−53 =111001011

| Counter | Positive Channel | | | Negative Channel | | |
|---|---|---|---|---|---|---|
| | Digit | Store Signal | Temp. Storage | Digit | Store Signal | Temp. Storage |
| 0 | 1. | Clear | ---------- | 1 | Clear | ---------- |
| | | Store | 0 | | Store | 0 |
| 1 | 1 | Clear | 0 | 0 | ---------- | 0 |
| | | Store | 1 | | ---------- | 0 |
| 2 | φ (1) | Clear | 0 | 1 | Clear | 0 |
| | | Store | 2 | | Store | 2 |
| 3 | 1 | Clear | 0 | 0 | ---------- | 2 |
| | | Store | 3 | | ---------- | 2 |
| 4 | 0 | ---------- | 3 | 1 | Clear | 0 |
| | | ---------- | 3 | | Store | 4 |
| 5 | 0 | ---------- | 3 | 1 | Clear | 0 |
| | | ---------- | 3 | | Store | 5 |
| 6 | 1 | Clear | 0 | φ (1) | Clear | 0 |
| | | Store | 6 | | Store | 6 |
| 7 | 1 | Clear | 0 | 0 | ---------- | 6 |
| | | Store | 7 | | ---------- | 6 |
| Store→7 | 1 | Clear | 0 | 0 | ---------- | 6 |

At "Store," only the temporary storage unit in the negative channel contains an increment. Thus: $-2^6$ or 1–110 is transmitted to the random access memory.

The second digit channel comprises the cores AC1 through AC8 and the cores AB5 through AB8. The third digit channel comprises the cores AD1 through AD8 and the cores AE1 through AE4. The fourth digit channel is comprised of cores AF1 through AF8 and cores AE5 through AE8. Read out paths are connected to alternate cores of the shift register, the inputs to such read out paths being normally inhibited by address pulses, which enter from the address tracks of the drum memory at the point ADR1 through ADR6. As shown, the first read out path from the first digit channel is taken from the core AA2 and is read out to the core AG1. As will be noted, the signal from ADR1 enters the core AG5 and then travels to the core AG6 and, on leaving the core AG6, provides an inhibit to each of the read out paths from the four digit channels to the cores AG1, AG2, AG3, and AG4. Thus, the output of the core AA2 is normally inhibited from appearing in the core AG1 by the output of the core AG6. In order to read the four digit word which is stored in the cores AA2, AC2, AD2 and AF2, no pulse will appear in the ADR1 point and therefore, the cores AG1, AG2, AG3 and AG4 will not be inhibited. Thus, the signals which are present in cores AA2, AC2, AD2 and AF2, of the four digit channels, will appear in the cores AG1, AG2, AG3 and AG4. As will be noted, from an inspection of FIGURE 10, the same type of read out is provided for five other four digit words which may be stored within the random access memory.

Of course, it will be understood that each of the four digits read out will represent the sign and the three digits of an optimum increment, as has been more fully explained hereinbefore. Each of the six groups of read out cores are all connected to a series of four cores indicated as cores B'1, B'2, B'3, and B'4. Each of these four cores is in the form of a six input "or" circuit, so that whichever of the six groups of readout cores is being utilized, the four digit word which appears in those cores will be transferred to the B' cores by means of the "or" circuit into each core. It should be noted, that the B' cores, which accept the information from the read out cores, will, by proper gating, provide the selected increment to any desired part of the computer. Thus, it is seen how the increment is selected from the increment storage or the random access memory and then may be utilized wherever desired within the arithmetic unit of the computer.

It should be noted, that in each of the four digit channels, the last core is provided with a connection back to the first core of each channel. By means of this feedback connection a circulating shift register is provided so that the four digit words stored in the random access memory will continue to circulate until a time line pulse is provided to inhibit the input of the last cores of the register. When the time line is utilized to inhibit the input of the last core of the register, new information may be inserted into the random access memory by way of the cores AA1, AC1, AD1, and AF1. Of course, one source of this new information will be from the cores W1, W2, W3, W5 of the increment selector, which was previously described.

There has been described an operational, variable increment computer, together with the major components which are utilized in the operation of such computer. The various components have been described as core logic circuits, it being understood that this is the preferred method of building the computer. However, it will be obvious to those skilled in the art, that various other types of circuits may be used, for example, various diode matrices, magnetic films, vacuum tubes and the like. Of course, it will be equally obvious to those skilled in this art, that the various types of components hereinbefore disclosed as the preferred embodiment of the invention may be altered or rearranged as desired without the departing from the spirit and scope of this invention. It will, therefore, be understood that the appended claims are intended to cover all such modifications as fall within the true spirit and scope of this invention.

What is claimed as new and which is desired to be secured by Letters Patents of the United States is:

1. In an incremental digital computer designed to perform calculations and to provide solutions based on incremental changes in input data, the improvement comprising an incremental selector means for selecting variable increments from a limited number of integral powers of a selected radix, said selected variable increments being dependent upon the incremental changes in the input data, and means for utilizing said selected variable increments in the calculations to be performed by the computer.

2. A digital computer utilizing incremental changes in the computer data to arrive at a desired solution comprising, means for accepting input data, means for comparing said input data to previous data for providing an output indicative of the incremental change in said data, means for converting said output to an optimum increment of a given radix most nearly approximating said output, a cyclical memory unit for storing said computer data, a non-cyclical memory unit for storing said optimum increments, an arithmetic unit for processing desired portions of both said stored data, means for obtaining desired portions of both said stored data and feeding said portions to said arithmetic unit, said arithmetic unit processing said data and providing an output representing a solution, and said converting means selecting an optimum variable increment based on said given radix most closely approximating said solution.

3. A digital computer utilizing incremental changes in data used to arrive at a solution comprising, means for accepting input data, means for comparing said input data to previous data for obtaining the incremental change in said data, a cyclical memory unit for storing said input and said previous data, an arithmetic unit for processing stored data, a second memory unit for storing and retrieving data in a non-cyclical manner, means for selecting variable increments, said variable increments being dependent upon incremental changes in input data in one mode of operation and being dependent upon the results of arithmetical processes in another mode of operation, said selected increments being stored in said second memory unit, and means for controlling the utilization of the data to perform the desired arithmetical processes.

4. In an incremental digital computer designed to perform calculations and to provide solutions based on incremental changes in input data, the improvement which comprises, an incremental selector means for selecting variable increments from a limited number of integral powers of a selected radix, said selected variable increments being dependent upon the incremental changes in the input data, means for storing said variable increments, said storing means enabling removal of said increments on a non-cyclical basis, and means for utilizing said selected variable increments to perform desired calculations.

5. An incremental digital computer utilizing incremental changes in computer data to provide desired solutions, comprising, a high speed memory device for storing computer data, means for comparing said stored computer data for obtaining incremental changes in said data, variable increment selecting means for selecting variable increments from a limited number of integral powers of a selected radix based on said incremental changes, said selected increments being those which most nearly approximate said incremental changes, rapid access memory means for storing said selected increments and for removing said selected increments according to the program of the computer, arithmetic means utilizing said stored computer data and said selected increments in desired arithmetic processes, and said variable increment selecting means selecting a variable increment of an integral power of said radix which most nearly approximates the results of said arithmetic processes.

6. An incremental digital computer which performs calculations and provides solutions based on incremental changes in input data comprising means for accepting input data, cyclical memory means for storing said data, means for comparing said input data to previous stored data for providing an output indicative of the incremental changes in said data, variable selecting means for converting said incremental changes in data to variable optimum increments of integral powers of the radix two, coding means for coding said optimum increments as a binary number indicative of the power of said radix, a rapid access memory unit for storing said optimum increments in coded form, arithmetic units for processing said stored data and said optimum increments and providing a solution, said arithmetic units including decoding means for decoding said coded optimum increments for use in said arithmetic units, and means for using said variable increment selecting means for converting said solution to a variable optimum increment.

7. An incremental digital computer which performs calculations and provides solutions utilizing incremental changes in computer data comprising; means for storing computer data, means for comparing said stored data to provide an output indicative of the incremental changes in said stored data, variable increment selecting means, means feeding said variable increment selecting means by the output of said comparing means, said variable increment selecting means selecting an optimum increment as an integral power of a selected radix which most nearly approximates said output, and means for storing said optimum increment to provide rapid retrieving when desired for use in computer calculations.

8. A mechanism for representing a value of the variable in digital form, including in combination: means operable to examine the variable recurrently; means operable to ascertain the change in the variable between successive examinations; elements responsive to said last means and operable to approximate said change by an integral power of a predetermined radix; and, means to store the successive integral powers of the radix determined by said elements in additive manner to provide a digital approximation of the variable by successive integral power of the radix approximations.

9. A computer adapted to receive a series of numbers in sequence and to approximate the accumulated value of the series with minimum error, comprising: an increment selector means having an input circuit and an output circuit, the selector means being operable upon application of a number to the input circuit to produce an approximation of the same in the output circuit; means to apply said numbers to the input circuit in succession; means operable to reintroduce each number into the input circuit in unison with the next succeeding number of the sequence, and in additive relation thereto and, means responsive to a number in the output circuit of the increment selector operable to introduce that number into the input circuit in unison with the next succeeding number applied thereto and in subtractive relation therewith.

10. Apparatus for performing computations in accordance with the algorithm $U\Delta T+V\Delta W=s\Delta Z$, successively, and with minimization of accumulated error, comprising in combination: a first multiplier responsive to the members U and ΔT and operable recurrently to produce a number representing the product thereof; a second multiplier responsive to the numbers V and ΔW and operable recurrently and in substantial synchronism with the first multiplier to produce a number representing the product thereof; an increment selector means having an input circuit and an output circuit and operable upon introduction of a number into the input circuit to produce an approximation thereof in the output circuit; and means operable to apply to the input circuit of the increment selector, in additive sense, the product of the first multiplier and the product of the second multiplier upon each recurrence of the same, the number applied to the input circuit of the increment selector on the next previous operation and in additive sense to the products of said multipliers, and the number appearing in the output circuit of the increment selector on the next previous operation and in subtractive sense.

11. In a computer mechanism wherein numbers in the form of integral powers of the radix are stored in exponential form and decoded to series digital form, the improvement comprising: means defining a serial path of logic elements between which a pulse is advanced step-by-step with a predetermined time between successive digits; means effective at a predetermined time to initiate such pulse; means responsive to the exponent of the number stored and effective to delay travel of the pulse from said first element to said last element by the multiple of said predetermined time equal to the value of the stored exponent.

12. A logic mechanism operable to convert a serial digital number to radix two to a like serial digital number having as its most significant digit the same most significant digit as the closest integral power of radix two, the mechanism including in combination: an input logic element; an output logic element; means defining a primary number transfer path between said elements, whereby a serial digital number fed into the input element appears subsequently at the output element; means defining a secondary number transfer path from said input element and accommodating at least two successive digits of the number; and means responsive to the presence of two successive digits in said secondary path operable to introduce a digit into the output element at the time the digit of next greater significance, if present, reaches the output element through said primary number path.

13. In a binary digital computer wherein computations are made through the use of integral power of the radix approximations of numbers, the combination of: means responsive to the places of the number to be approximated in increasing order of significance; means responsive to each pair of successive digits in said number to produce a digit at the time said first means responds to the place of next greater significance in the number; and, computer elements responsive in "or" logic to said first means and said second means and insensitive to digits other than the most significant digit.

14. A device to multiply a serial digital number to predetermined radix having digits spaced by predetermined time intervals by an integral power of the radix, stored as the exponent of such power, said device comprising in combination: an input logic element; an output logic element; means defining a path between said elements over which a pulse is advanced with a predetermined time delay between application to the input element and appearance from the output element; means effective to supply said serial digit number to said input element; means effective in response to the exponent of said integral power of said radix to define a path or increased pulse delay from said input element to said output element, such path having increased delay by the number of said intervals equal to the exponent of said integral power of the radix, whereby the appearance of the serial number at the output element is delayed in time by number of intervals equal to the integral power stored.

15. An apparatus for converting a digital number of a given radix to the value of the exponent of the closest integral power of the radix comprising, in combination: a counter mechanism having an output circuit and operable when energized to count at predetermined time intervals; first means operable to produce said number in serial digital form with said predetermined time intervals between successive places of said number; second means operable to start the counter mechanism prior to the appearance of the most significant digit of the number produced by said last recited means; and third means operable in response to the count on the counter and the most significant digit of said number appearing in said first means for providing an output equal to said exponent value.

16. A computer adapted to receive a series of digital numbers to a predetermined radix and to approximate the accumulated value of the series with minimum error, comprising in combination: an increment selector means having an input circuit adapted to receive a series digital number and an output circuit, said selector being operable to produce a number in the output circuit representing the exponent of an integral power of the radix approximation of the number applied to the input circuit; means to apply said series of numbers in sequence to said input circuit; means operable to re-introduce each number into the input circuit in unison with the next succeeding number of the sequence and in additive relation therewith; and, means responsive to a number in the output circuit of the increment selector to convert the same to digital form, and to introduce the same into the input circuit in unison with the next succeeding number applied thereto and in subtractive relation therewith.

17. A digital computer operable to perform a calculation recurrently, including in combination: means recurrently operable to produce a digital number; arithmetic elements responsive to said number and operable to perform a calculation based upon the value of the same, thereby producing a new digital number in response to each successive number produced by said first means; an increment selector means having an input circuit and an output circuit and operable in response to application of a digital number to a predetermined radix to the input circuit to produce an integral power of the radix approximation of the same in the output circuit; storage means having first parts operable to store the number applied to said input circuit between successive calculations and second parts operable to store the number in said output circuit between successive calculations; and means effective upon production of each successive number by said arithmetic elements to apply the same and the number stored in the first part of the storage means in additive sense to the input circuit of the increment selector and the number stored in the second parts of the storage means in subtractive sense to the input circuit of the increment selector.

18. In a computer mechanism wherein numbers in the form of integral powers of the radix are stored in form representing such power, together with a symbol indicative of the sign of the number, and are decoded to digital form for arithmetic processing; the improvement comprising: means defining a series of logic elements having an input element and an output element between which a pulse is advanced step-by-step with a predetermined time between digits; means effective at a predetermined time to initiate such pulse in the input element, and thereby pulse the output element at a predetermined later time; means effective in response to the exponent of the number stored to define a path of increased pulse delay from said input element to said output element, such path having increased delay in the amount of the multiple of said predetermined time equal to said power; a complementer responsive to said symbol and selectively operable in response to the same to complement the number in the input element or to pass the number in the output circuit without change, and means to feed the symbol to the complementer no later than the appearance of the pulse from the output element.

19. In a binary digital computer wherein computations are made through the use of integral power of the radix approximations of numbers, the combination of: means operable to examine the places of the number to be approximated in increasing order of significance; means responsive to each pair of successive digits in said number to produce a digit at the time the place of next greater significance of said number is examined by said first means; storage elements responsive in "or" logic to said first means and said second means, said elements being effective at least until the last digit is examined and including clearing circuits operative in response to each digit to clear the same immediately before receipt of each such digit; and means responsive to the condition of the storage means after the most significant digit has been received thereby.

20. An increment selector comprising in combination: first means defining an array of output elements; second means operable when energized to impart a digital count to said elements with a predetermined time interval between counts; third means operable to produce a digital number with its successive places having increased significance and spaced by said predetermined time interval; a flip-flop for each of said output elements and including "and" logic elements responsive to said output elements, respectively, and to said third means; and means operable to stop the flip-flops in unison immediately prior to the arrival of a digit from said third means at the "and" logic elements.

21. A computer responsive to a plurality of time-varying numbers and effective in a predetermined cycle of operations to perform recurrent computations involving the same, comprising in combination: an increment selector means having an input circuit and an output circuit and effective upon application of a number to a predetermined radix to the input circuit to produce an integral power approximation of the same in the output circuit; means operable to store successive numbers in the output circuit of the increment selector and to accumulate values of the same from cycle to cycle; means operable during each cycle to examine the time-varying numbers in sequence and to produce numbers representing, respectively, the successive increments of the same; means operable to apply said increments in sequence to the input circuit of the increment selector, thereby producing a sequence of integral power approximations thereof in the output circuit of the increment selector; arithmetic means operable in response to application of numbers to perform predetermined computations; means operable during each cycle to apply selected numbers from said memory means to said arithmetic means, thereby producing successive computed numbers; and means to apply said computed numbers to the input circuit of the increment selector to produce successive integral power approximations of the same in the output circuit thereof.

References Cited in the file of this patent

UNITED STATES PATENTS

| | | |
|---|---|---|
| 2,538,636 | Williams | Jan. 16, 1951 |
| 2,636,672 | Hamilton et al. | Apr. 28, 1953 |
| 2,782,398 | West et al. | Feb. 19, 1957 |
| 2,913,176 | Berezin | Nov. 17, 1959 |
| 2,934,271 | Kessel | Apr. 26, 1960 |
| 2,941,720 | Marshall et al. | June 21, 1960 |

FOREIGN PATENTS

| | | |
|---|---|---|
| 745,907 | Great Britain | Mar. 7, 1956 |
| 777,244 | Great Britain | June 19, 1957 |

OTHER REFERENCES

Waller et al.: A Comparison of Whole Value and Incremental Digital Techniques by the Use of Patch Panel Logic, Conference Paper, No. CP 60–121 A.I.E.E., pages 4–7.

Townsend: Serial Digital Adders for a Variable Radix of Notation, pp. 410–416, Electronic Engineering, October 1953.

The Increment Computer, Control Engineering, September 1957, page 173.